(12) United States Patent
Lin et al.

(10) Patent No.: US 11,815,740 B2
(45) Date of Patent: Nov. 14, 2023

(54) IMAGING LENS SET WITH PLASTIC LENS ELEMENT, IMAGING LENS MODULE AND ELECTRONIC DEVICE

(71) Applicant: LARGAN PRECISION CO., LTD., Taichung (TW)

(72) Inventors: Cheng-Feng Lin, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 17/743,495

(22) Filed: May 13, 2022

(65) Prior Publication Data
US 2022/0269043 A1    Aug. 25, 2022

Related U.S. Application Data

(63) Continuation of application No. 16/846,601, filed on Apr. 13, 2020, now Pat. No. 11,360,288, which is a
(Continued)

(30) Foreign Application Priority Data

May 16, 2017    (TW) .................................. 106116147

(51) Int. Cl.
*G02B 9/12*    (2006.01)
*G02B 7/02*    (2021.01)
(Continued)

(52) U.S. Cl.
CPC .............. *G02B 9/12* (2013.01); *G02B 1/041* (2013.01); *G02B 5/003* (2013.01); *G02B 7/021* (2013.01);
(Continued)

(58) Field of Classification Search
CPC .......... G02B 9/12; G02B 1/041; G02B 5/003; G02B 7/021; G02B 7/022; G02B 13/0035; G02B 13/0045; G02B 27/0018
(Continued)

(56) References Cited

U.S. PATENT DOCUMENTS

| 7,042,659 B2 | 5/2006 | Huang et al. |
| 7,068,448 B2 | 6/2006 | Huang |
| 7,088,530 B1 | 8/2006 | Recco et al. |
| 7,304,813 B2 | 12/2007 | Sakaki |

(Continued)

FOREIGN PATENT DOCUMENTS

| CN | 104007529 A | 8/2014 |
| CN | 203759336 U | 8/2014 |

(Continued)

*Primary Examiner* — William Choi
(74) *Attorney, Agent, or Firm* — McClure, Qualey & Rodack, LLP

(57) ABSTRACT

An imaging lens set includes three plastic lens elements, which are a first lens element, a second lens element and a third lens element, and a light blocking sheet. The first lens element includes a first flat abutting portion and a first conical surface. The second lens element includes a second flat abutting portion, a second conical surface, a fourth flat abutting portion and a fourth conical surface. The third lens element includes a third flat abutting portion and a third conical surface. The first flat abutting portion is abutted with the second flat abutting portion, the first conical surface contacts with the second conical surface, and the third conical surface contacts with the fourth conical surface. The light blocking sheet is abutted with the third flat abutting portion and the fourth flat abutting portion, respectively.

17 Claims, 26 Drawing Sheets

Related U.S. Application Data continuation of application No. 16/385,135, filed on Apr. 16, 2019, now Pat. No. 10,656,377, which is a continuation of application No. 15/861,859, filed on Jan. 4, 2018, now Pat. No. 10,302,903.

(51) Int. Cl.
  *G02B 13/00* (2006.01)
  *G02B 1/04* (2006.01)
  *G02B 5/00* (2006.01)
  *G02B 27/00* (2006.01)

(52) U.S. Cl.
  CPC ......... *G02B 7/022* (2013.01); *G02B 13/0035* (2013.01); *G02B 13/0045* (2013.01); *G02B 27/0018* (2013.01)

(58) Field of Classification Search
  USPC .................................................. 359/738–740
  See application file for complete search history.

(56) References Cited

U.S. PATENT DOCUMENTS

| | | |
|---|---|---|
| 7,639,438 B2 | 12/2009 | Chen |
| 7,755,858 B2 | 7/2010 | Chen |
| 7,813,058 B2 | 10/2010 | Huang |
| 8,292,524 B1 | 10/2012 | Yu |
| 8,736,989 B2 | 5/2014 | Wu |
| 8,830,600 B2 | 9/2014 | Chang et al. |
| 9,042,040 B2 | 5/2015 | Kim |
| 9,128,265 B2 | 9/2015 | Kim et al. |
| 9,304,233 B2 | 4/2016 | Kim |
| 9,507,116 B2 | 11/2016 | Choi |
| 9,952,359 B2 | 4/2018 | Chang |
| 2015/0226931 A1 | 8/2015 | Huang |
| 2017/0176649 A1 | 6/2017 | Chang |

FOREIGN PATENT DOCUMENTS

| | | |
|---|---|---|
| CN | 205139406 U | 4/2016 |
| CN | 205333947 U | 6/2016 |
| JP | 2004216755 A | 8/2004 |

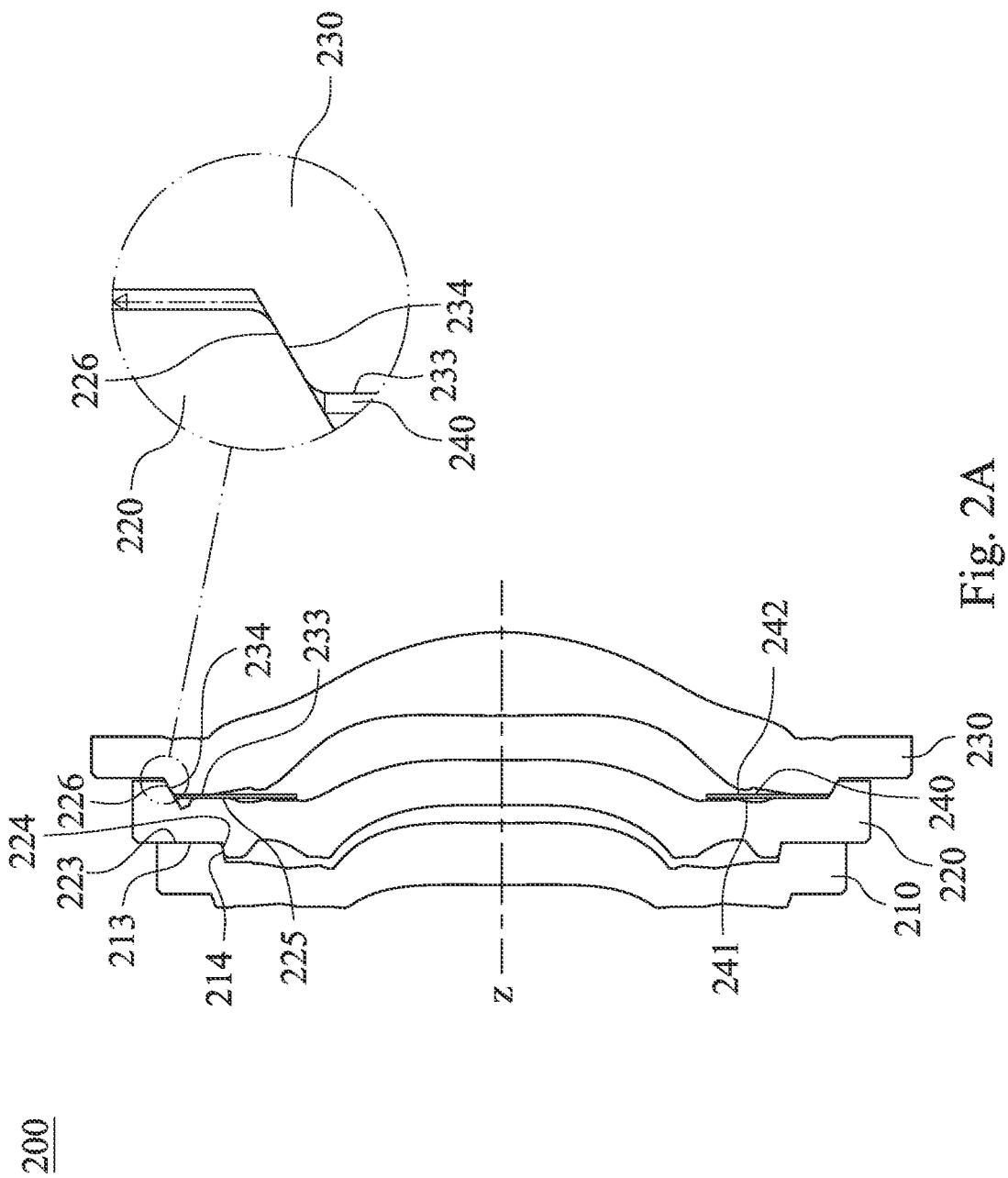

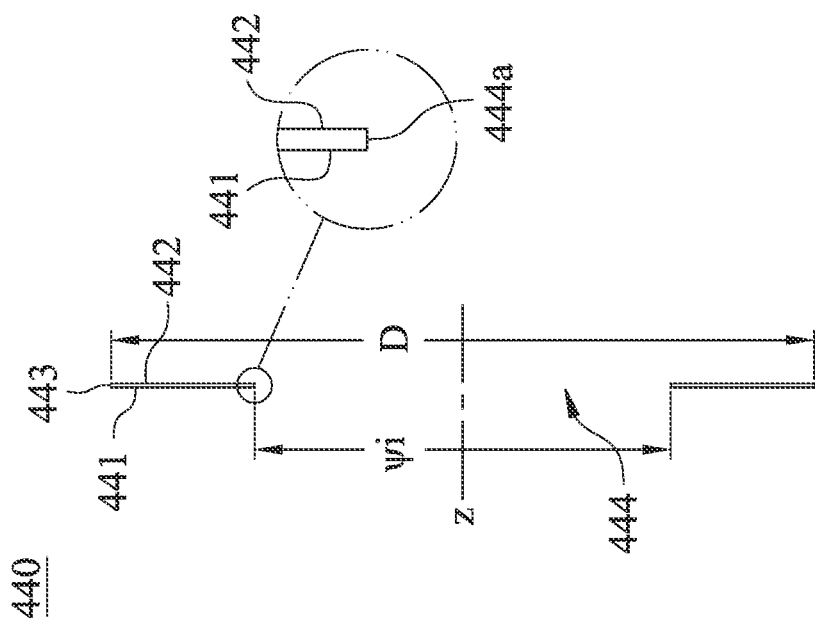

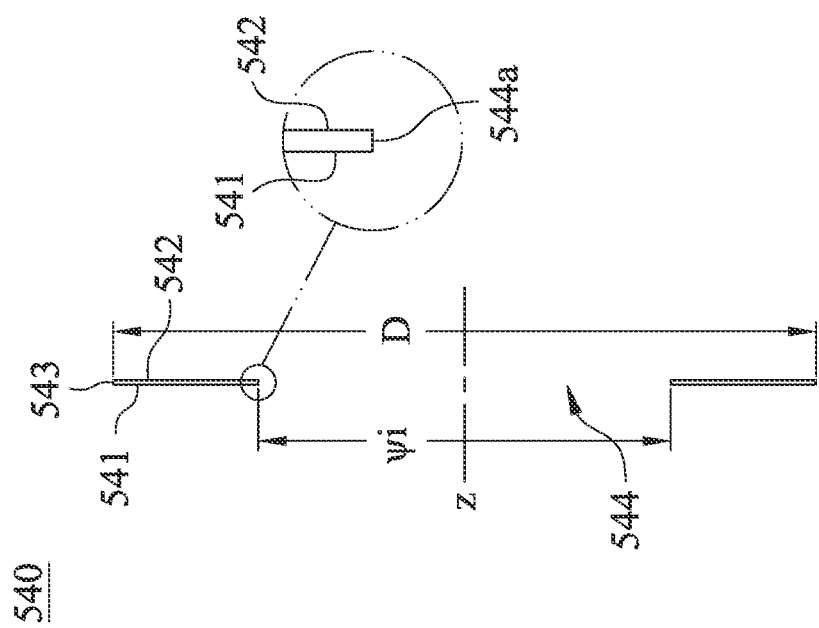

IMAGING LENS SET WITH PLASTIC LENS ELEMENT, IMAGING LENS MODULE AND ELECTRONIC DEVICE

RELATED APPLICATIONS

The present application is a continuation of U.S. application Ser. No. 16/846,601, filed Apr. 13, 2020, which is a continuation of U.S. application Ser. No. 16/385,135, filed Apr. 16, 2019, U.S. Pat. No. 10,656,377 issued on May 19, 2020, which is a continuation of U.S. application Ser. No. 15/861,859, filed Jan. 4, 2018, U.S. Pat. No. 10,302,903 issued on May 28, 2019, which claims priority to Taiwan Application Serial Number 106116147, filed May 16, 2017, which is herein incorporated by reference.

BACKGROUND

Technical Field

The present disclosure relates to an imaging lens set with plastic lens element and an imaging lens module. More particularly, the present disclosure relates to an imaging lens set and an imaging lens module which are applicable to a portable electronic device.

Description of Related Art

Recently, the portable devices, such as smart phone and pad, are developed rapidly and ubiquitous in the human life. The imaging lens disposed therein is thus becomes growth industry. With the improvement of the technology, more and more demands for high qualities of imaging lens come out. Therefore, in addition to improving the quality of imaging lens in optical design field, the precision of manufacturing and assembling processes are needed to be improved too.

FIG. 14 is a cross-sectional view of a conventional imaging lens module 6000. In FIG. 14, the imaging lens module 6000 includes a plastic barrel 6100, an optical lens assembly 6200 and at least one light blocking sheet 6300. The optical lens assembly 6200 includes a lens element 6210, a lens element 6220, a lens element 6230, a lens element 6240 and a lens element 6250, which are all disposed in the plastic barrel 6100. The light blocking sheet 6300 is disposed between the lens element 6230 and the lens element 6240. As the required pixel is increased, the difference between an outside diameter of the lens element 6220, an outside diameter of the lens element 6230 and an outside diameter of the lens element 6240 is gradually increased. In the meanwhile, a required thickness of the light blocking sheet 6300 becomes thinner. The light blocking sheet 6300 only can be clipped between the lens element 6230 and the lens element 6240 so that a design for sharing a pressing force suffered by the light blocking sheet 6300 is lacked. Thus, the light blocking sheet 6300 will suffer such the unusual pressing force so as to be warpage in the assembling process and allow a central opening to be wave-like distortion, that is, deflection. For an increasingly harsh photographic quality, such a small distortion will affect an actual image capture of the lens module under an intense light source so that an image quality of an object with high brightness will be lower than expected.

Given the above, how to simultaneously meet the requirements of suppressing the stray light and accurate alignment with the optical axis of the compact optical lens assembly has become one of the important subjects, so that the image quality of the compact optical lens assemblies can be enhanced, and the requirements of high-end optical systems with camera functionalities can be satisfied.

SUMMARY

According to one aspect of the present disclosure, an imaging lens set includes at least three plastic lens elements and at least one light blocking sheet. The three plastic lens elements include a first lens element, a second lens element and a third lens element which are arranged along a central axis of the imaging lens set in order from an object side to an image side. Each of the plastic lens elements and the light blocking sheet includes an object-side surface and an image-side surface disposed relative to the object-side surface. The first lens element includes a first flat abutting portion and a first conical surface, wherein the first flat abutting portion is disposed on the image-side surface of the first lens element, the first conical surface is disposed on the image-side surface of the first lens element, and the first conical surface is closer to the central axis than the first flat abutting portion thereto. The second lens element includes a second flat abutting portion, a second conical surface, a fourth flat abutting portion and a fourth conical surface, wherein the second flat abutting portion is disposed on the object-side surface of the second lens element, and the fourth flat abutting portion is disposed on the image-side surface of the second lens element, and the second conical surface is disposed at the object-side surface of the second lens element, and the second conical surface is closer to the central axis than the second flat abutting portion thereto. The fourth conical surface is disposed on the image-side surface of the second lens element, and the fourth conical surface is farer away from the central axis than the fourth flat abutting portion to the central axis. The third lens element includes a third flat abutting portion and a third conical surface, wherein the third flat abutting portion is disposed on the object-side surface of the third lens element, and the third conical surface is disposed on the object-side surface of the third lens element, and the third conical surface is farer away from the central axis than the third flat abutting portion to the central axis. The first flat abutting portion is abutted with the second flat abutting portion, the first conical surface contacts with the second conical surface, and the third conical surface contacts with the fourth conical surface. The light blocking sheet has a central opening and is coaxially arrange with the plastic lens elements. The light blocking sheet is disposed between the second lens element and the third lens element, and further includes an outer diameter surface. The outer diameter surface connects the object-side surface and the image-side surface of the light blocking sheet and is coaxial with the central opening, wherein the object-side surface of the light blocking sheet is abutted with the fourth flat abutting portion, and the image-side surface of the light blocking sheet is abutted with the third flat abutting portion. When a minimum diameter of the fourth conical surface is $\psi 4$, and a maximum diameter of the second conical surface is $\psi 2$, the following condition is satisfied: $0.13 \text{ mm} < (\psi 4 - \psi 2)/2 < 1.20 \text{ mm}$.

According to another aspect of the present disclosure, an imaging lens module includes a plastic barrel and the imaging lens set as mentioned above. The plastic barrel has a minimum central opening, and the imaging lens set is disposed in the plastic barrel.

According to another aspect of the present disclosure, an electronic device includes the abovementioned imaging lens module and an image sensor. The image sensor is disposed on an image surface of the imaging lens module.

BRIEF DESCRIPTION OF THE DRAWINGS

The present disclosure can be more fully understood by reading the following detailed description of the embodiment, with reference made to the accompanying drawings as follows:

FIG. 2A is a schematic view of an imaging lens set according to the 2nd example of the present disclosure;

FIG. 4C is a cross-sectional view of a light blocking sheet of the imaging lens set in FIG. 4A;

FIG. 5C is a cross-sectional view of a light blocking sheet of the imaging lens set in FIG. 5A;

DETAILED DESCRIPTION

Figure 1A:
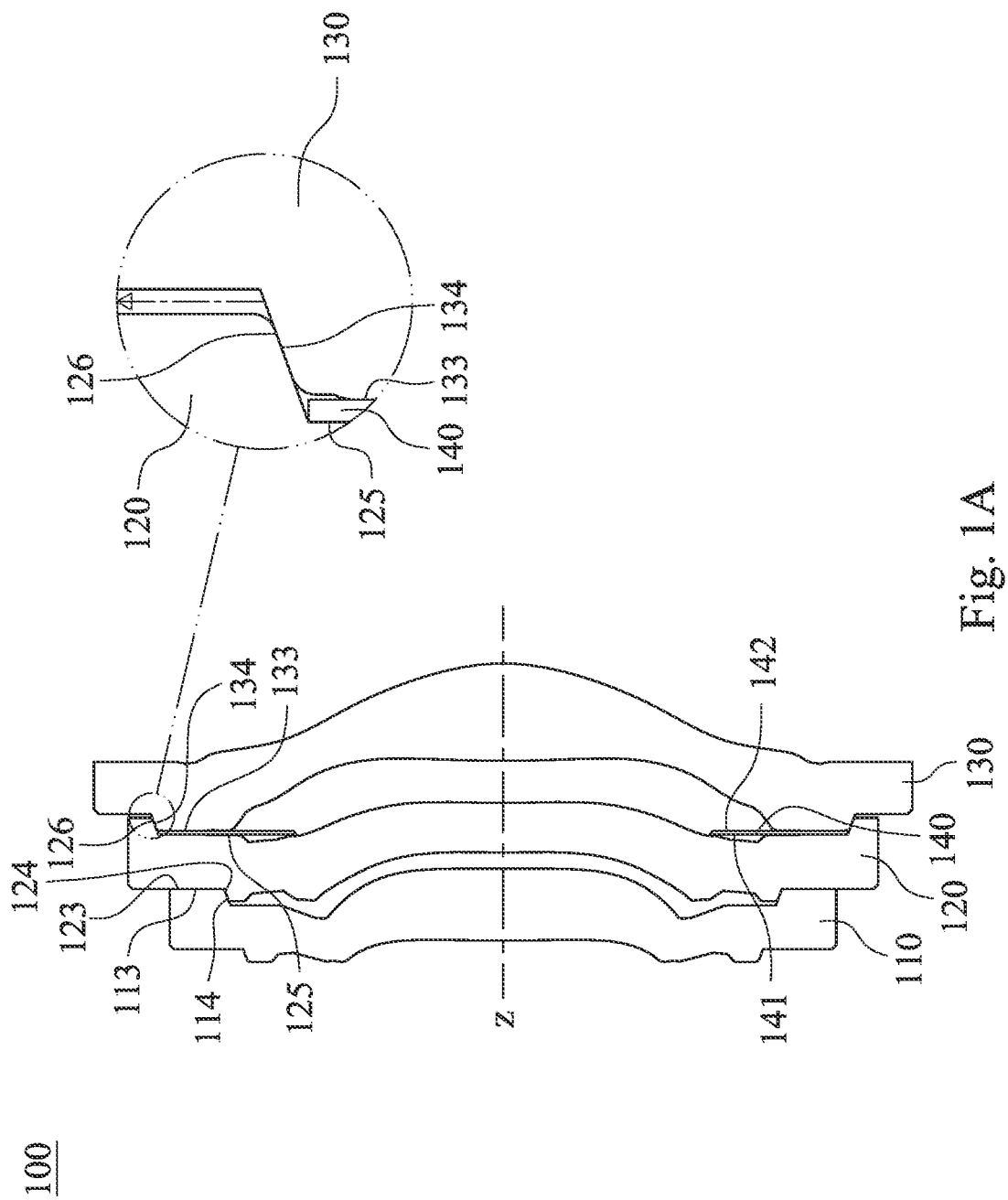
FIG. 1A is a schematic view of an imaging lens set according to the 1st example of the present disclosure.

An imaging lens set includes at least three plastic lens elements and at least one light blocking sheet. Each of the three plastic lens elements and the light blocking sheet includes an object-side surface and an image-side surface disposed relative to the object-side surface. The light blocking sheet has a central opening and is coaxially arranged with the three plastic lens elements. Thus, manufacturing costs can be effectively reduced by using the plastic lens element. Furthermore, the light blocking sheet is provided for blocking the unwanted light in the imaging lens module.

The three plastic lens elements include a first lens element, a second lens element and a third lens element which are arranged along a central axis of the imaging lens set, in order from an object side to an image side. Specifically, the first lens element includes a first flat abutting portion and a first conical surface. The first flat abutting portion is disposed on the image-side surface of the first lens element, and the first conical surface is disposed on the image-side surface of the first lens element, and the first conical surface is closer to the central axis than the first flat abutting portion thereto. The second lens element includes a second flat abutting portion, a second conical surface, a fourth flat abutting portion and a fourth conical surface. The second flat abutting portion is disposed on the object-side surface of the second lens element, and the fourth flat abutting portion is disposed on the image-side surface of the second lens element. The second conical surface is disposed on the object-side surface of the second lens element, and the second conical surface is closer to the central axis than the second flat abutting portion thereto. The fourth conical surface is disposed on the image-side surface of the second lens element, and the fourth conical surface is farer away from the central axis than the fourth flat abutting portion to the central axis. The third lens element includes a third flat abutting portion and a third conical surface. The third flat abutting portion is disposed on the object-side surface of the third lens element. The third conical surface is disposed on the object-side surface of the third lens element, and the third conical surface is farer away from the central axis than the third flat abutting portion to the central axis. The light blocking sheet is disposed between the second lens element and the third lens element and further includes an outer diameter surface. The outer diameter surface connects the object-side surface and the image-side surface of the light blocking sheet and is coaxial with the central opening.

In particular, the first flat abutting portion can be abutted with the second flat abutting portion, the first conical surface can contact with the second conical surface, and the third conical surface can contact with the fourth conical surface. Moreover, the object-side surface of the light blocking sheet can be abutted with the fourth flat abutting portion, and the image-side surface of the light blocking sheet can be abutted with the third flat abutting portion. When a minimum diameter of the fourth conical surface is $\psi 4$, and a maximum diameter of the second conical surface is $\psi 2$, the following condition can be satisfied: $0.13 \text{ mm} < (\psi 4 - \psi 2)/2 < 1.20 \text{ mm}$.

Thus, a first axial connecting structure can be constructed between the first lens element and the second lens element by the contact of the first conical surface and the second conical surface and the abutment of the first flat abutting portion and the second flat abutting portion. Thus, the first lens element and the second lens element can be assembled with each other and aligned to the central axis of the imaging lens set. A second axial connecting structure can be further constructed by the contact of the fourth conical surface and the third conical surface and the abutment of the fourth flat abutting portion, the third flat abutting portion, the object-side surface and the image-side surface of the light blocking sheet. Thus, the second lens element and the third lens element can be assembled with each other and aligned to the central axis of the imaging lens set. That is, it is favorable for aligning the lens elements having excessive difference between the outer diameter thereof by the arrangement of the first axial connecting structure and the second axial connecting structure so as to improve the accuracy of the assembling process.

The first conical surface and the second conical surface can be assembled with each other for aligning to the central axis, and the fourth conical surface and the third conical surface are assembled with each other for aligning to the central axis. Thus, it is easier to control the dimensional accuracy of the conical surface so that the utilization of the conical surface during the assembling process is beneficial for mass production. When the minimum diameter of the fourth conical surface is $\psi 4$, and the maximum diameter of the second conical surface is $\psi 2$, the following condition is further satisfied: 0.18 mm<$(\psi 4-\psi 2)/2$<0.85 mm. Thus, the location of the conical surface can be clearly defined so that a poor injection is avoided during the manufacture of the plastic lens elements through a plastic molding process. In addition, a diameter of the first conical surface of the first lens element in the present disclosure is reduced gradually from the image-side surface thereof to the object-side surface thereof, a diameter of each of the second conical surface and the fourth conical surface of the second lens element is also reduced gradually from the image-side surface thereof to the object-side surface thereof, and a diameter of the third conical surface of the third lens element is reduced gradually from the image-side surface thereof to the object-side surface thereof. However, the arrangements of the present disclosure will not be limited thereto.

When a diameter of the outer diameter surface of the light blocking sheet is D, and the minimum diameter of the fourth conical surface is $\psi 4$, the following condition is satisfied: $|\psi 4-D|/2 \le 0.05$ mm. Accordingly, the light blocking sheet will not be over tilt due to the small difference between the diameter of the outer diameter surface of the light blocking sheet and the minimum diameter of the fourth conical surface. Thus, the light blocking efficiency will not be affected. When the diameter of the outer diameter surface of the light blocking sheet is D, the minimum diameter of the fourth conical surface is $\psi 4$, and the maximum diameter of the second conical surface is $\psi 2$, the following condition is satisfied: $0.6<(\pi^2)\times((\psi 4-\psi 2)/D)<3.6$. Thus, a space for receiving the light blocking sheet can be improved for blocking more stray light from the second conical surface. Preferably, the following condition can be satisfied: $0.82<(\pi^2)\times((\psi 4-\psi 2)/D)<2.9$. Thus, a preferably blocking area can be provided. When a minimum inner diameter of the central opening of the light blocking sheet is $\psi i$, and the diameter of the outer diameter surface of the light blocking sheet is D, the following condition is satisfied: $0.4<\psi i/D<0.76$. Thus, the effect of the image quality resulted from the light blocking sheet with an oversized central opening and the effect of lens specifications resulted from the light blocking sheet with an insufficient-sized central opening can be prevented.

When an angle between the second conical surface and the central axis is $\alpha 1$ and corresponding to an angle between the first conical surface and the central axis, the following condition is satisfied: 3 degrees<$\alpha 1$<42 degrees. When an angle between the fourth conical surface and the central axis is $\alpha 2$ and corresponding to an angle between the third conical surface and the central axis, the following condition is satisfied: 3 degrees<$\alpha 2$<42 degrees. Thus, the possibility of the mass production can be greatly enhanced by a proper angle of the conical surface. Preferably, the following condition of the angle between the fourth conical surface and the central axis can be further satisfied: 13 degrees<$\alpha 2$<33 degrees. Thus, the roundness of single lens element will not affect the fit of the lens elements by designing the proper angle of the conical surface. Similarly, the following condition of the angle between the second conical surface and the central axis can be further satisfied: 13 degrees<$\alpha 1$<33 degrees.

When an outer diameter of the first lens element is D1, an outer diameter of the second lens element is D2, and the minimum diameter of the fourth conical surface is $\psi 4$, the following condition is satisfied: $D1 \le \psi 4 < D2$. Thus, the abovementioned imaging lens set can be applied to an optical design system with a larger aperture stop. When the outer diameter of the first lens element is D1, and the minimum diameter of the fourth conical surface is $\psi 4$, the following condition is satisfied: $0.9<\psi 4/D1<1.35$. Thus, each of the lens elements can be aligned to a center of the adjacent lens element through the conical surface for reducing the tolerance of the assembling process. In particular, the outside diameter of the first lens element and the minimum diameter of the fourth conical surface can further satisfy the following condition: $0.94<\psi 4/D1<1.15$. Thus it is favorable for reducing the quality difference between the imaging lens modules with the same model. When more than two imaging lens modules with the same model are used in one mobile phone, the imaging lens set, which satisfies the condition as mentioned above, can reduce the effect of the quality difference of the imaging lens modules.

When the outer diameter of the second lens element is D2, and a width of the fourth conical surface is w4, the following condition is satisfied: $0.1<(\pi^2)\times w4/D2<0.45$. By a specific design of the fourth conical surface, such as a proper width, a partial thickness of the plastic lens element will not be too thick to affect the manufacturing quality so as to maintain the possibility of manufacturing the plastic lens element through the plastic molding process. Moreover, the width of the fourth conical surface, the minimum diameter of the fourth conical surface and the maximum diameter of the second conical surface can further satisfy the following condition: $2.2<(\psi 4-\psi 2)/(2 \times w4)<6.2$. Thus, a sub-injection flow channel, which is narrow partially, can be formed for dealing with the injection molding process with a too slow injection rate so as to save the cost. More particularly, the width of the fourth conical surface, the minimum diameter of the fourth conical surface and the maximum diameter of the second conical surface can further satisfy the following condition: $2.8<(\psi 4-\psi 2)/(2 \times w4)<5.4$. Thus, the imaging lens set of the present disclosure is suitable to be applied in the mass production, which is required to be completed within a short period, with harsh production conditions.

In the present disclosure, the second lens element contacts with the third lens element only via the fourth conical surface and the third conical surface. Thus, it is favorable for avoiding the second lens element from suffering the unnecessary pressing force so as to be applied in the imaging lens set, which has the large difference of the outside diameters.

Moreover, a part of the third conical surface is not overlapped with the second lens element along a direction perpendicular to and away from the central axis. Thus, the roundness of single lens element will not affect the fit of the lens elements by designing such the air gap.

The present disclosure further provides an imaging lens module including the abovementioned imaging lens set. The imaging lens set can be engaged with at least one lens element or an opaque member of the imaging lens module through the engaging structure thereof. When the imaging lens set is engaged with the lens element, the central axis thereof can be aligned to an optical axis of the lens element for increasing the optical accuracy and maintaining high image quality. When the imaging lens set is engaged with the opaque member, the stability of the whole imaging lens module can be increased, and image quality of the imaging lens module will not be affected due to the collision in the external environment.

In particular, the opaque member can be but not limited to a plastic barrel of the imaging lens module. The imaging lens set can be disposed in the plastic barrel along the central axis. In particular, the plastic barrel has a barrel hole. More particularly, a minimum inner diameter position of the barrel hole can be an aperture stop of the imaging lens module. Therefore, it is favorable for simplifying the mechanical design of the imaging lens module.

Furthermore, the imaging lens module can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

Accordingly, an electronic device is further provided in the present disclosure for satisfying the requirements for high resolution and image quality of present compact imaging lens modules. Preferably, the electronic device can further include but not limited to a display, a control unit, a storage unit, a random access memory unit (RAM) or a read-only memory unit (ROM) or a combination thereof.

According to the above description of the present disclosure, the following specific examples are provided for further explanation.

1ST EXAMPLE

Figure 1B:
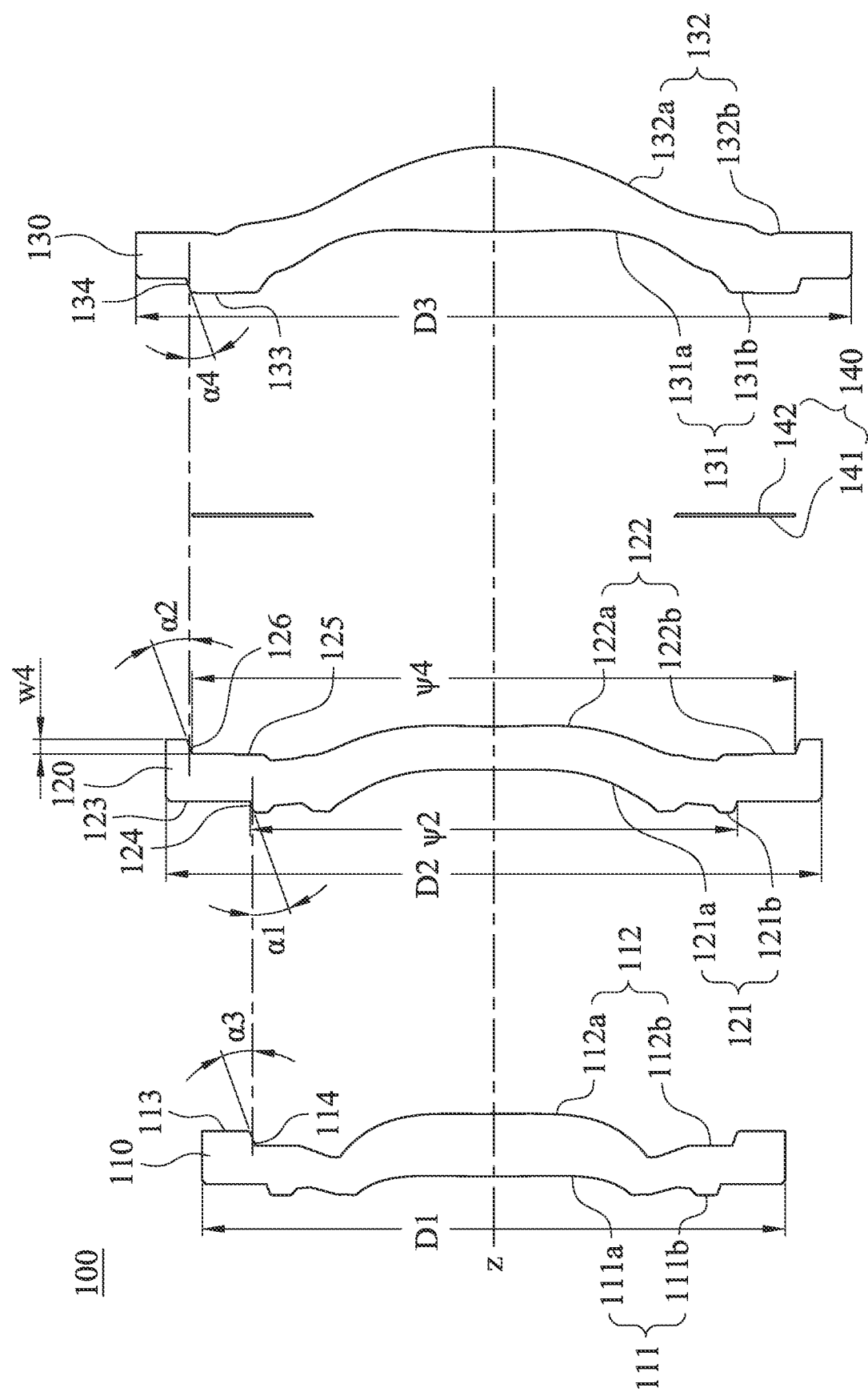
FIG. 1B is an exploded view of the imaging lens set in FIG. 1A.

FIG. 1A is a schematic view of an imaging lens set 100 according to the 1st example of the present disclosure, and FIG. 1B is an exploded view of the imaging lens set 100 in FIG. 1A. In FIG. 1A, the imaging lens set 100 of the 1st example includes three plastic lens elements and a light blocking sheet, in which the imaging lens set 100 has a central axis z. In particular, the three plastic lens elements include a first lens element 110, a second lens element 120 and a third lens element 130 which are arranged along the central axis z of the imaging lens set 100 in order from an object side to an image side. The light blocking sheet 140 is disposed between the second lens element 120 and the third lens element 130. More particularly, the light blocking sheet 140 has a central opening 144 (its reference numeral is labeled in FIG. 10) which is coaxial with the first lens element 110, the second lens element 120 and the third lens element 130.

In FIG. 1B, each of the first lens element 110, the second lens element 120, the third lens element 130 and the light blocking sheet 140 includes an object-side surface and an image-side surface disposed relative to the object-side surface. In particular, the first lens element 110 includes the object-side surface 111 and the image-side surface 112 disposed relative to the object-side surface 111. The second lens element 120 includes the object-side surface 121 and the image-side surface 122. The third lens element 130 includes the object-side surface 131 and the image-side surface 132. The light blocking sheet 140 includes the object-side surface 141 and the image-side surface 142.

Each of the object-side surfaces of the plastic lens elements includes an effective optical section and a lens peripheral section which are arranged from the central axis z to the edge thereof. The effective optical section is aspheric, and the imaging light passes through the effective optical section. The lens peripheral section surrounds the effective optical portion. Moreover, each of the image-side surfaces of the plastic lens elements includes an effective optical section and a lens peripheral section which are arranged from the central axis z to the edge thereof. The effective optical section is aspheric, and the imaging light passes through the effective optical section. The lens peripheral section surrounds the effective optical portion. In details, the object-side surface 111 of the first lens element 110 includes an effective optical section 111a and a lens peripheral section 111b which are arranged from the central axis z to the edge thereof, and the image-side surface 112 of the first lens element 110 includes an effective optical section 112a and a lens peripheral section 112b which are arranged from the central axis z to the edge thereof. The object-side surface 121 of the second lens element 120 includes an effective optical section 121a and a lens peripheral section 121b which arranged from the central axis z to the edge thereof, and the image-side surface 122 of the second lens element 120 includes an effective optical section 122a and a lens peripheral section 122b which are arranged from the central axis z to the edge thereof. The object-side surface 131 of the third lens element 130 includes an effective optical section 131a and a lens peripheral section 131b which are arranged from the central axis z to the edge thereof, and the image-side surface 132 of the third lens element 130 includes an effective optical section 132a and a lens peripheral section 132b which are arranged from the central axis z to the edge thereof.

The first lens element 110 includes a first flat abutting portion 113 and a first conical surface 114, in which the first flat abutting portion 113 and the first conical surface 114 are both disposed on the image-side surface 112 of the first lens element 110. In particular, the first flat abutting portion 113 and the first conical surface 114 are both located within the lens peripheral section 112b of the image-side surface 112 of the first lens element 110. The first conical surface 114 is formed by extending the first flat abutting portion 113 towards the central axis z and bending towards the object-side surface 111. Thus, the first conical surface 114 is closer to the central axis z than the first flat abutting portion 113 thereto, but will not limited thereto.

The second lens element 120 includes a second flat abutting portion 123, a second conical surface 124, a fourth flat abutting portion 125 and a fourth conical surface 126. In particular, the second flat abutting portion 123 and the second conical surface 124 are both located at the object-side surface 121 of the second lens element 120. The second conical surface 124 is formed by extending the second flat abutting portion 123 towards the central axis z and bending towards the outside of the object-side surface 121. Thus, the second conical surface 124 is closer to the central axis z than the second flat abutting portion 123. Moreover, the fourth flat abutting portion 125 and the fourth conical surface 126 are both located at the image-side surface 122 of the second lens element 120. The fourth conical surface 126 is formed by extending the fourth flat abutting portion 125 away from the central axis z and bending towards the outside of the image-side surface 122. Thus, the fourth conical surface 126 is farer away from the central axis z than the fourth flat abutting portion 125.

The third lens element 130 includes a third flat abutting portion 133 and a third conical surface 134. The third flat abutting portion 133 and the third conical surface 134 are both disposed on the object-side surface 131 of the third lens element 130. The third conical surface 134 is formed by extending the third flat abutting portion 133 away from the central axis z and bending towards the image-side surface 132. Thus, the third conical surface 134 is farer away from the central axis z than the third flat abutting portion 133.

As shown in FIG. 1A, the first flat abutting portion 113 is abutted with the second flat abutting portion 123, the first conical surface 114 contacts with the second conical surface 124, and thus a first axial connecting structure (its reference numeral is omitted) is constructed between the first lens element 110 and the second lens element 120, so that the first lens element 110 and the second lens element 120 can be assembled with each other and aligned to the central axis z of the imaging lens set 100. Similarly, the fourth conical surface 126 contacts with the third conical surface 134, and the object-side surface 141 of the light blocking sheet 140 is abutted with the fourth flat abutting portion 125, and the image-side surface 142 of the light blocking sheet 140 is abutted with the third flat abutting portion 133. Thus, a second axial connecting structure (its reference numeral is omitted) is constructed among the second lens element 120, the light blocking sheet 140 and the third lens element 130, so that the second lens element 120 and the third lens element 130 can be assembled with each other and aligned to the central axis z of the imaging lens set 100. As shown in a partial enlarged diagram of FIG. 1A, a part of the third conical surface 134 is not overlapped with the second lens element 120 along a direction perpendicular to and away from the central axis z. That is, in the second axial connecting structure, an air gap is arranged between the edge of the second lens element 120 and the edge of the third lens element 130 in the direction perpendicular to the central axis z. Thus, the roundness of single lens element will not affect the fit of the lens elements.

In FIG. 1B, an angle α1 between the second conical surface 124 and the central axis z is disposed corresponding to an angle between the first conical surface 114 and the central axis z, that is, α3, for assembling with each other. Thus, the roundness of single lens element will not affect the fit of the lens elements by designing the proper angle of the conical surface so as to increase the possibility of the mass production. Similarly, an angle α2 between the fourth conical surface 126 and the central axis z is disposed corresponding to an angle, that is, α4, between the third conical surface 134 and the central axis z for assembling with each other.

In addition, the imaging lens set 100 can include other optical elements disposed between each two of the first lens element 110, the second lens element 120 and the third lens element 130 or between the object-side surface 111 of the first lens element 110 and the image-side surface 132 of the third lens element 130. The optical elements can be but not limited to lens elements, imaging compensation elements, light blocking sheets, spacers or retainers. The first lens element 110 can be manufactured by an injection molding process and integrated with the first flat abutting portion 113 and the first conical surface 114. Similarly, both the second lens element 120 and the third lens element 130 can be manufactured by the injection molding process and have the same configuration.

Figure 1D:
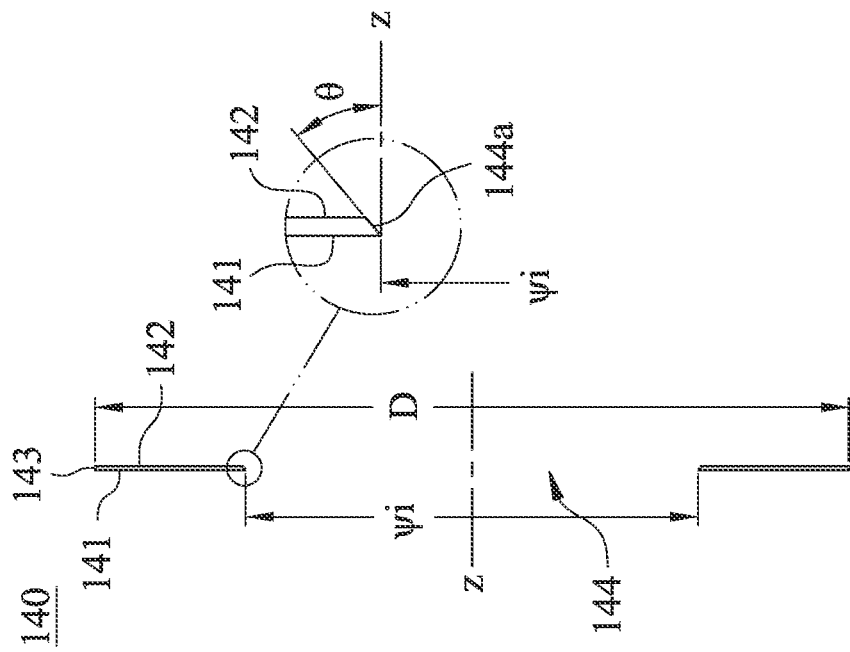
FIG. 1D is a cross-sectional view along line 1d-1d of FIG. 1C.
Figure 1C:
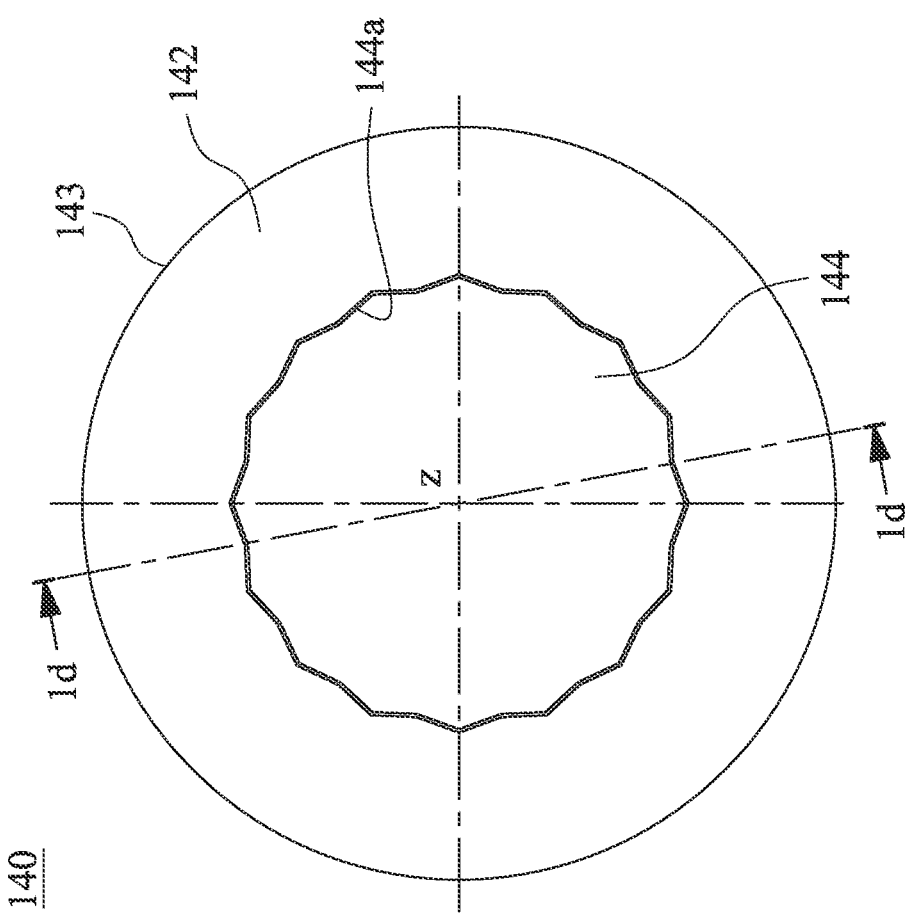
FIG. 1C is a top view of a light blocking sheet of the imaging lens set in FIG. 1A.

FIG. 1C is a top view of a light blocking sheet 140 of the imaging lens set 100 in FIG. 1A, and FIG. 1D is a cross-sectional view along line 1d-1d of FIG. 1C. In FIG. 1C and FIG. 1D, the light blocking sheet 140 has the central axis z. The object-side surface 141 and the image-side surface 142 of the light blocking sheet 140 further includes an outer diameter surface 143 and a central opening 144. The central axis z passes through the central opening 144. The outer diameter surface 143 connects the object-side surface 141 with the image-side surface 142 of the light blocking sheet 140 and is coaxial with the central opening 144. The central opening 144 is surrounded by an inner surface 144a thereof.

In the 1st example, the inner surface 144a of the central opening 144 of the light blocking sheet 140 is non-circular. In FIG. 1C, the light blocking sheet 140 includes a plurality of protruding structures (their reference numerals are omitted) which are extended from the central opening 144 thereof to the central axis z, thus the inner surface 144a of the central opening 144 is a polygon. Therefore, it is favorable for reducing the unwanted residual light around the image and the stray light reflection caused by the light blocking sheet. More particularly, in the 1st example, the light blocking sheet and the protruding structures, which are extended from the central opening of the light blocking sheet, can be integrally form.

In FIG. 1D, a diameter of the central opening 144 of the light blocking sheet 140 on the object-side surface 141 is smaller than a diameter of the central opening 144 on the image-side surface 142. When an angle between the inner surface 144a of the central opening 144 and the central axis z is θ, θ is 40 degrees.

In the imaging lens set 100 according to the 1st example, an outer diameter of the first lens element 110 is D1, an outer diameter of the second lens element 120 is D2, an outside diameter of the third lens element 130 is D3, a diameter of the outer diameter surface 143 of the light blocking sheet 140 is D, a maximum diameter of the second conical surface 124 is ψ2, a minimum diameter of the fourth conical surface 126 is ψ4, a minimum inner diameter of the central opening 144 of the light blocking sheet 140 is ψi, a width of the fourth conical surface is w4 (In particular, w4 is a width of the fourth conical surface 126 parallel to the central axis z), an angle between the second conical surface 124 and the central axis z is α1, and an angle between the fourth conical surface 126 and the central axis z α2. The data of D1, D2, D3, D, ψ2, ψ4, ψi, w4, α1, α2, (ψ4-ψ2)/2, |ψ4-D|/2, (π^2)×((ψ4-ψ2)/D), ψi/D, ψ4/D1, (π^2)×w4/D2 and (ψ4-ψ2)/(2×w4) of the 1st example are listed in Table 1.

TABLE 1

| 1st example | | | |
|---|---|---|---|
| D1 (mm) | 4.4 | α2 (degree) | 20 |
| D2 (mm) | 4.95 | (ψ4-ψ2)/2 (mm) | 0.435 |
| D3 (mm) | 5.4 | |ψ4-D|/2 (mm) | 0 |
| D (mm) | 4.55 | (π^2) × ((ψ4-ψ2)/D) | 1.887 |
| ψ2 (mm) | 3.68 | ψi/D | 0.6 |
| ψ4 (mm) | 4.55 | ψ4/D1 | 1.034 |
| ψi (mm) | 2.73 | (π^2) × w4/D2 | 0.217 |
| w4 (mm) | 0.11 | (ψ4-ψ2)/(2 × w4) | 3.955 |
| α1 (degree) | 20 | | |

2ND EXAMPLE

Figure 2B:
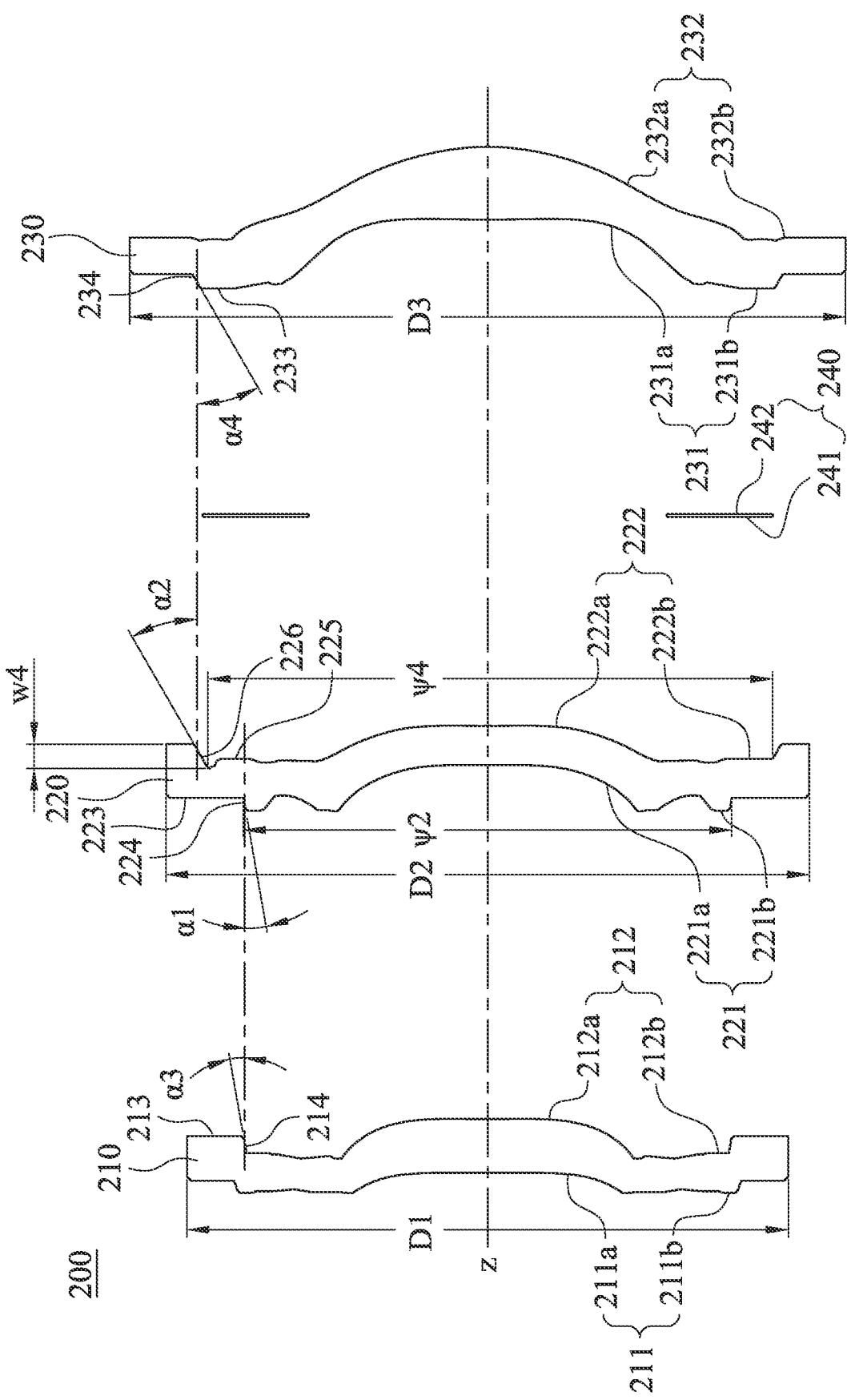
FIG. 2B is an exploded view of the imaging lens set in FIG. 2A.

FIG. 2A is a schematic view of an imaging lens set 200 according to the 2nd example of the present disclosure, and FIG. 2B is an exploded view of the imaging lens set 200 in FIG. 2A. In FIG. 2A, the imaging lens set 200 of the 2nd example includes three plastic lens elements and a light blocking sheet, in which the imaging lens set 200 has a central axis z. In particular, the three plastic lens elements include a first lens element 210, a second lens element 220 and a third lens element 230 which are arranged along the central axis z of the imaging lens set 200 in order from an object side to an image side. The light blocking sheet 240 is disposed between the second lens element 220 and the third lens element 230. More particularly, the light blocking sheet 240 has a central opening 244 (its reference numeral is labeled in FIG. 2C) which is coaxial with the first lens element 210, the second lens element 220 and the third lens element 230.

In FIG. 2B, each of the first lens element 210, the second lens element 220, the third lens element 230 and the light blocking sheet 240 includes an object-side surface and an image-side surface disposed relative to the object-side surface. In particular, the first lens element 210 includes the object-side surface 211 and the image-side surface 212 disposed relative to the object-side surface 211. The second lens element 220 includes the object-side surface 221 and the image-side surface 222. The third lens element 230 includes the object-side surface 231 and the image-side surface 232. The light blocking sheet 240 includes the object-side surface 241 and the image-side surface 242.

In details, the object-side surface 211 of the first lens element 210 includes an effective optical section 211a and a lens peripheral section 211b which are arranged from the central axis z to the edge thereof, and the image-side surface 212 of the first lens element 210 includes an effective optical section 212a and a lens peripheral section 212b which are arranged from the central axis z to the edge thereof. The object-side surface 221 of the second lens element 220 includes an effective optical section 221a and a lens peripheral section 221b which are arranged from the central axis z to the edge thereof, and the image-side surface 222 of the second lens element 220 includes an effective optical section 222a and a lens peripheral section 222b which are arranged from the central axis z to the edge thereof. The object-side surface 231 of the third lens element 230 includes an effective optical section 231a and a lens peripheral section 231b which are arranged from the central axis z to the edge thereof, and the image-side surface 232 of the third lens element 230 includes an effective optical section 232a and a lens peripheral section 232b which are arranged from the central axis z to the edge thereof.

In the 2nd example, the first lens element 210 includes a first flat abutting portion 213 and a first conical surface 214. The first flat abutting portion 213 and the first conical surface 214 are both disposed on the image-side surface 212 of the first lens element 210, and the first conical surface 214 is closer to the central axis z than the first flat abutting portion 213. The second lens element 220 includes a second flat abutting portion 223, a second conical surface 224, a fourth flat abutting portion 225 and a fourth conical surface 226. The second flat abutting portion 223 and the second conical surface 224 are both disposed on the object-side surface 221 of the second lens element 220, and the second conical surface 224 is closer to the central axis z than the second flat abutting portion 223 thereto. The fourth flat abutting portion 225 and the fourth conical surface 226 are both disposed on the image-side surface 222 of the second lens element 220, and the fourth conical surface 226 is farer away from the central axis z than the fourth flat abutting portion 225 to the central axis z. The third lens element 230 includes a third flat abutting portion 233 and a third conical surface 234. The third flat abutting portion 233 and the third conical surface 234 are both disposed on the object-side surface 231 of the third lens element 230, and the third conical surface 234 is farer away from the central axis z than the third flat abutting portion 233.

As shown in FIG. 2A, the first flat abutting portion 213 is abutted with the second flat abutting portion 223, the first conical surface 214 contacts with the second conical surface 224. Thus, the first lens element 210 and the second lens element 220 are assembled with each other and aligned to the central axis z of the imaging lens set 200. Similarly, the fourth conical surface 226 contacts with the third conical surface 234, and the object-side surface 241 of the light blocking sheet 240 is abutted with the fourth flat abutting portion 225, and the image-side surface 242 of the light blocking sheet 240 is abutted with the third flat abutting portion 233. Thus, the second lens element 220 and the third lens element 230 are assembled with each other and aligned to the central axis z of the imaging lens set 200. As shown in a partial enlarged diagram of FIG. 2A, a part of the third conical surface 234 is not overlapped with the second lens element 220 along a direction perpendicular to and away from the central axis z. That is, an air gap is arranged between the edge of the second lens element 220 and the edge of the third lens element 230 in a direction perpendicular to the central axis z. Thus, the roundness of single lens element will not affect the fit of the lens elements.

In FIG. 2B, an angle α1 between the second conical surface 224 and the central axis z is disposed corresponding to an angle between the first conical surface 214 and the central axis z, that is, α3, for assembling with each other. Similarly, an angle α2 between the fourth conical surface 226 and the central axis z is disposed corresponding to an angle, that is, α4, between the third conical surface 234 and the central axis z for assembling with each other.

Figure 2D:
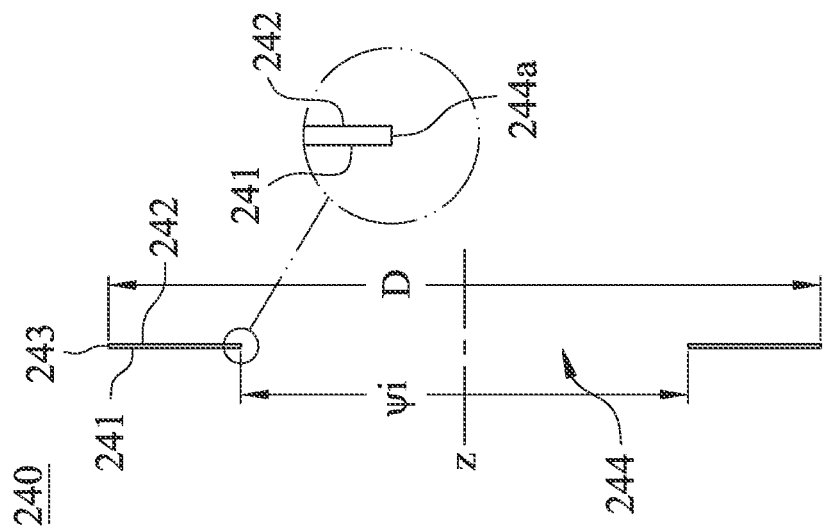
FIG. 2D is a cross-sectional view along line 2d-2d of FIG. 2C.
Figure 2C:
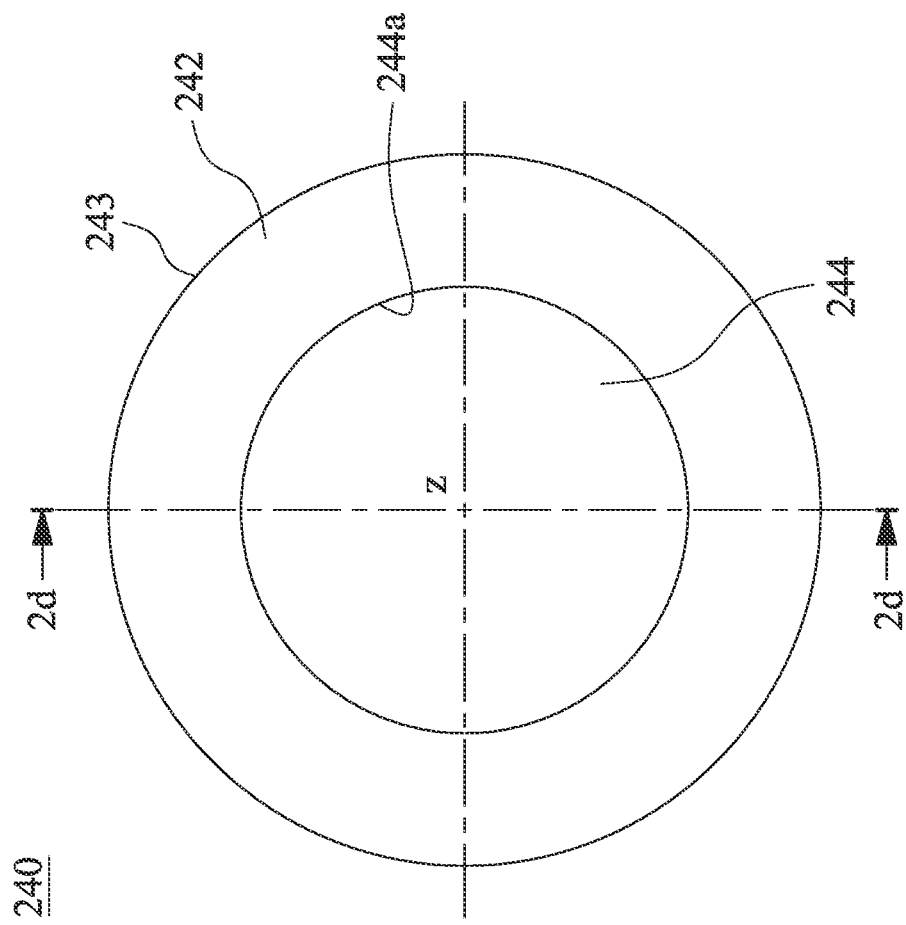
FIG. 2C is a top view of a light blocking sheet of the imaging lens set in FIG. 2A.

FIG. 2C is a top view of a light blocking sheet 240 of the imaging lens set 200 in FIG. 2A, and FIG. 2D is a cross-sectional view along line 2d-2d of FIG. 2C. In FIG. 2C and FIG. 2D, the light blocking sheet 240 has the central axis z. The object-side surface 241 and the image-side surface 242 of the light blocking sheet 240 further includes an outer diameter surface 243 and a central opening 244. The central axis z passes through the central opening 244. The outer diameter surface 243 connects the object-side surface 241 with the image-side surface 242 of the light blocking sheet 240 and is coaxial with the central opening 244. The central opening 244 is surrounded by an inner surface 244a thereof. In particular, the inner surface 244a of the central opening 244 of the light blocking sheet 240 is circular. More particularly, a diameter of the central opening 244 of the light blocking sheet 240 on the object-side surface 241 is equal to a diameter of the central opening 244 on the image-side surface 242.

In addition to the structural features as mentioned above, the imaging lens set 200 includes other optical elements disposed between each two of the first lens element 210, the second lens element 220 and the third lens element 230 or between the object-side surface 211 of the first lens element 210 and the image-side surface 232 of the third lens element 230. The optical elements can be but not limited to lens elements, imaging compensation elements, light blocking sheets, spacers or retainers.

The data of the parameters D1, D2, D3, D, ψ2, ψ4, ψi, w4, α1, α2, (ψ4−ψ2)/2, |ψ4−D|/2, (π^2)×((ψ4−ψ2)/D), ψi/D, ψ4/D1, (π^2)×w4/D2 and (ψ4−ψ2)/(2×w4) of the imaging lens set 200 according to the 2nd example of the present disclosure are listed in the following Table 2. The definitions of these parameters shown in Table 2 are the same as those stated in the imaging lens set 100 of the 1st example shown in FIG. 2B and FIG. 2D, so an explanation in this regard will not be provided again.

TABLE 2

| 2nd example | | | |
|---|---|---|---|
| D1 (mm) | 4.3 | α2 (degree) | 30 |
| D2 (mm) | 4.6 | (ψ4-ψ2)/2 (mm) | 0.255 |
| D3 (mm) | 5.12 | \|ψ4-D\|/2 (mm) | 0.04 |
| D (mm) | 4.08 | $(\pi^2) \times ((\psi4-\psi2)/D)$ | 1.234 |
| ψ2 (mm) | 3.49 | ψi/D | 0.627 |
| ψ4 (mm) | 4 | ψ4/D1 | 0.93 |
| ψi (mm) | 2.56 | $(\pi^2) \times w4/D2$ | 0.227 |
| w4 (mm) | 0.105 | (ψ4-ψ2)/(2 × w4) | 2.429 |
| α1 (degree) | 10 | | |

3RD EXAMPLE

Figure 3A:
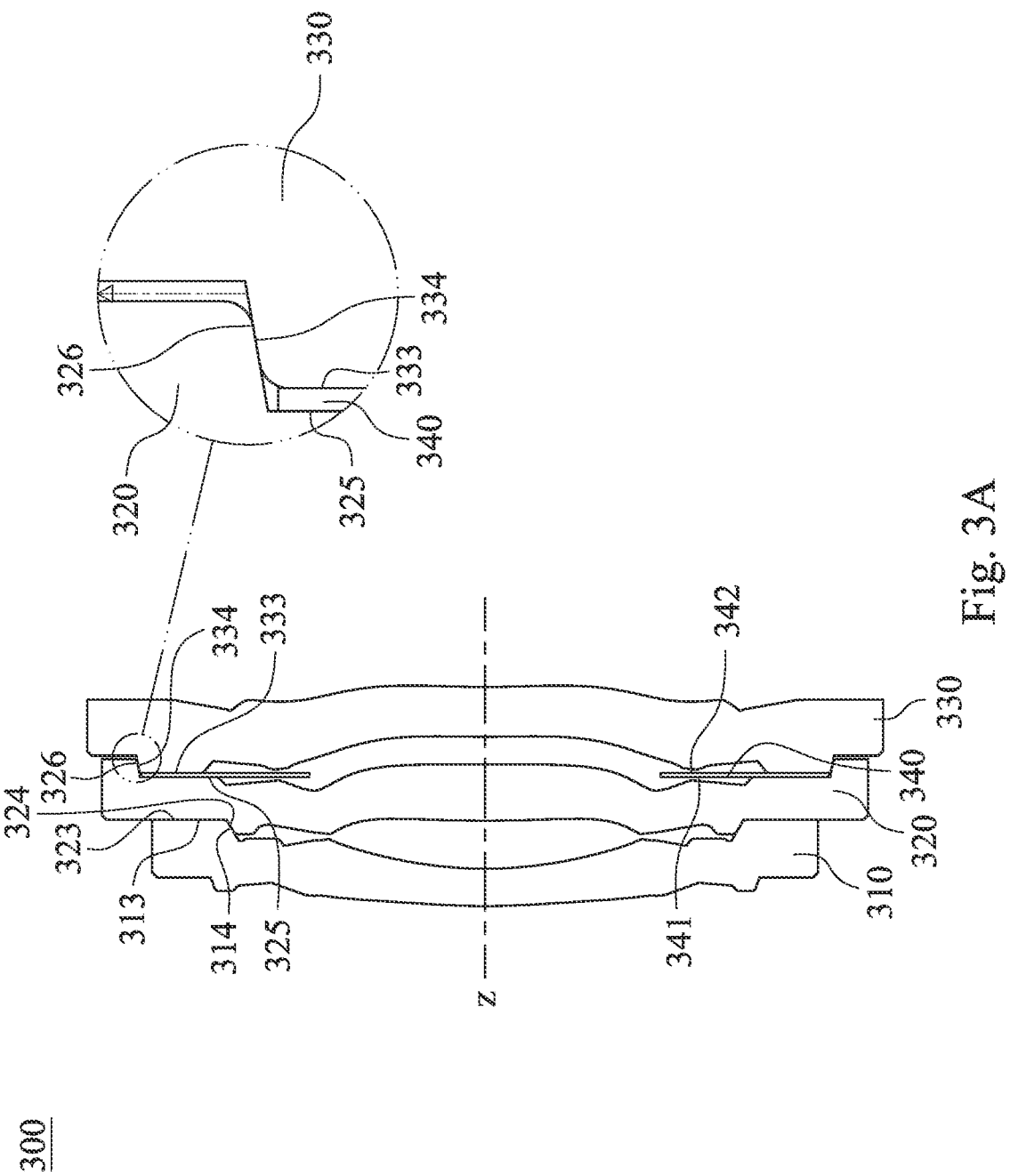
FIG. 3A is a schematic view of an imaging lens set according to the 3rd example of the present disclosure.
Figure 3B:
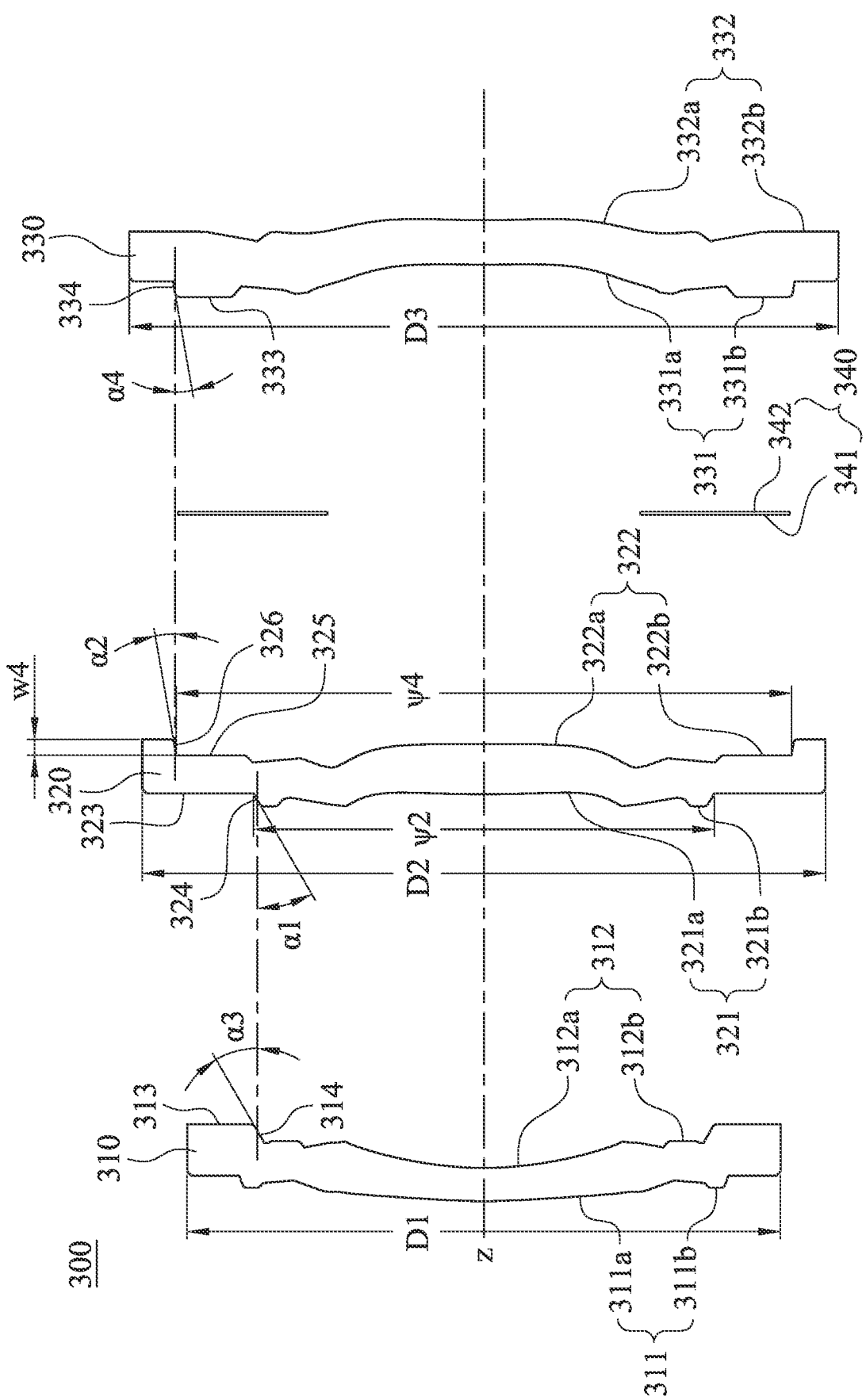
FIG. 3B is an exploded view of the imaging lens set in FIG. 3A.

FIG. 3A is a schematic view of an imaging lens set 300 according to the 3rd example of the present disclosure, and FIG. 3B is an exploded view of the imaging lens set 300 in FIG. 3A. In FIG. 3A, the imaging lens set 300 of the 3rd example includes three plastic lens elements and a light blocking sheet, in which the imaging lens set 300 has a central axis z. In particular, the three plastic lens elements include a first lens element 310, a second lens element 320 and a third lens element 330 which are arranged along the central axis z of the imaging lens set 300 from an object side to an image side. The light blocking sheet 340 is disposed between the second lens element 320 and the third lens element 330. More particularly, the light blocking sheet 340 has a central opening 344 (its reference numeral is labeled in FIG. 3C) coaxially with the first lens element 310, the second lens element 320 and the third lens element 330.

In FIG. 3B, each of the first lens element 310, the second lens element 320, the third lens element 330 and the light blocking sheet 340 includes an object-side surface and an image-side surface disposed relative to the object-side surface. In particular, the first lens element 310 includes the object-side surface 311 and the image-side surface 312 disposed relative to the object-side surface 311. The second lens element 320 includes the object-side surface 321 and the image-side surface 322. The third lens element 330 includes the object-side surface 331 and the image-side surface 332. The light blocking sheet 340 includes the object-side surface 341 and the image-side surface 342.

In details, the object-side surface 311 of the first lens element 310 includes an effective optical section 311a and a lens peripheral section 311b which are arranged from the central axis z to the edge thereof, and the image-side surface 312 of the first lens element 310 includes an effective optical section 312a and a lens peripheral section 312b which are arranged from the central axis z to the edge thereof. The object-side surface 321 of the second lens element 320 includes an effective optical section 321a and a lens peripheral section 321b which are arranged from the central axis z to the edge thereof, and the image-side surface 322 of the second lens element 320 includes an effective optical section 322a and a lens peripheral section 322b which are arranged from the central axis z to the edge thereof. The object-side surface 331 of the third lens element 330 includes an effective optical section 331a and a lens peripheral section 331b which are arranged from the central axis z to the edge thereof, and the image-side surface 332 of the third lens element 330 includes an effective optical section 332a and a lens peripheral section 332b which are arranged from the central axis z to the edge thereof.

In the 3rd example, the first lens element 310 includes a first flat abutting portion 313 and a first conical surface 314. The first flat abutting portion 313 and the first conical surface 314 are both disposed on the image-side surface 312 of the first lens element 310, and the first conical surface 314 is closer to the central axis z than the first flat abutting portion 313 thereto. The second lens element 320 includes a second flat abutting portion 323, a second conical surface 324, a fourth flat abutting portion 325 and a fourth conical surface 326. The second flat abutting portion 323 and the second conical surface 324 are both disposed on the object-side surface 321 of the second lens element 320, and the second conical surface 324 is closer to the central axis z than the second flat abutting portion 323 thereto. The fourth flat abutting portion 325 and the fourth conical surface 326 are both disposed on the image-side surface 322 of the second lens element 320, and the fourth conical surface 326 is farer away from the central axis z than the fourth flat abutting portion 325 to the central axis z. The third lens element 330 includes a third flat abutting portion 333 and a third conical surface 334. The third flat abutting portion 333 and the third conical surface 334 are both disposed on the object-side surface 331 of the third lens element 330, and the third conical surface 334 is farer away from the central axis z than the third flat abutting portion 333 to the central axis z.

As shown in FIG. 3A, the first flat abutting portion 313 is abutted with the second flat abutting portion 323, the first conical surface 314 contacts with the second conical surface 324. Thus, the first lens element 310 and the second lens element 320 are assembled with each other and aligned to the central axis z of the imaging lens set 300. The fourth conical surface 326 contacts with the third conical surface 334, and the object-side surface 341 of the light blocking sheet 340 is abutted with the fourth flat abutting portion 325, and the image-side surface 342 of the light blocking sheet 340 is abutted with the third flat abutting portion 333. Thus, the second lens element 320 and the third lens element 330 are assembled with each other and aligned to the central axis z of the imaging lens set 300. As shown in a partial enlarged diagram of FIG. 3A, a part of the third conical surface 334 is not overlapped with the second lens element 320 along a direction perpendicular to and away from the central axis z. That is, an air gap is arranged between the edge of the second lens element 320 and the edge of the third lens element 330 in a direction perpendicular to the central axis z. Thus, the roundness of single lens element will not affect the fit of the lens elements.

In FIG. 3B, an angle α1 between the second conical surface 324 and the central axis z is disposed corresponding to an angle between the first conical surface 314 and the central axis z, that is, α3, for assembling with each other. Similarly, an angle α2 between the fourth conical surface 326 and the central axis z is disposed corresponding to an angle, that is, α4, between the third conical surface 334 and the central axis z for assembling with each other.

Figure 3C:
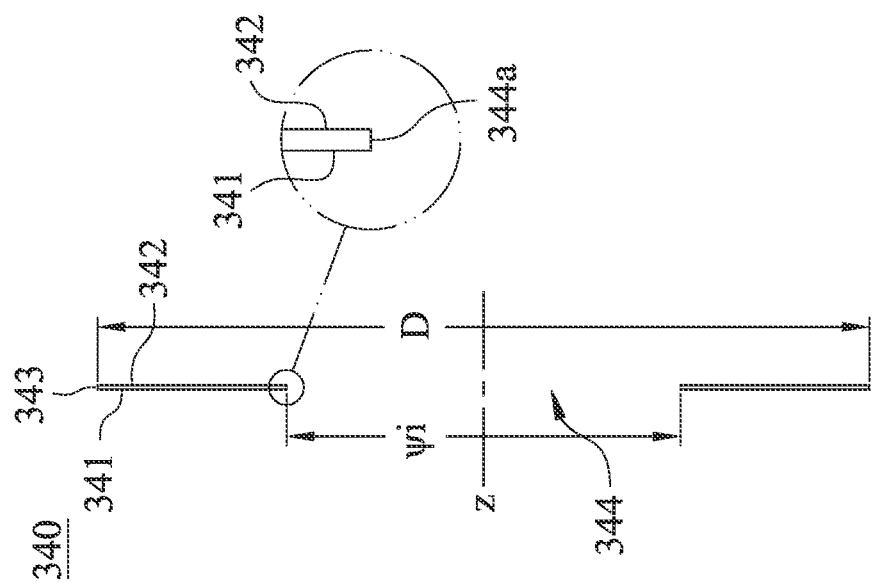
FIG. 3C is a cross-sectional view of a light blocking sheet of the imaging lens set in FIG. 3A.

In FIG. 3C, which is a cross-sectional view of a light blocking sheet 340 of the imaging lens set 300 in FIG. 3A. In the 3rd example, the design of the light blocking sheet 340 is approximately identical to the design of the light blocking sheet 240 provided in the 2nd example. In FIG. 3C, the light blocking sheet 340 has the central axis z. The object-side surface 341 and the image-side surface 342 of the light blocking sheet 340 further includes an outer diameter surface 343 and a central opening 344. The central axis z passes through the central opening 344. The outer diameter surface 343 connects the object-side surface 341 with the image-side surface 342 of the light blocking sheet 340 and is coaxial with the central opening 344. The central opening 344 is surrounded by an inner surface 344a thereof. In particular, the inner surface 344a of the central opening 344 of the light blocking sheet 340 is circular. More particularly, a diameter of the central opening 344 of the light blocking sheet 340 on the object-side surface 341 is equal to a diameter of the central opening 344 on the image-side surface 342.

In addition to the structural features as mentioned above, the imaging lens set 300 includes other optical elements disposed between each two of the first lens element 310, the second lens element 320 and the third lens element 330 or between the object-side surface 311 of the first lens element 310 and the image-side surface 332 of the third lens element 330. The optical elements can be but not limited to lens elements, imaging compensation elements, light blocking sheets, spacers or retainers.

The data of the parameters D1, D2, D3, D, ψ2, ψ4, ψi, w4, α1, α2, (ψ4−ψ2)/2, |ψ4−D|/2, (π^2)×((ψ4−ψ2)/D), ψi/D, ψ4/D1, (π^2)×w4/D2 and (ψ4−ψ2)/(2×w4) of the imaging lens set 300 according to the 3rd example of the present disclosure are listed in the following Table 3. The definitions of these parameters shown in Table 3 are the same as those stated in the imaging lens set 100 of the 1st example shown in FIG. 3B and FIG. 3C, so an explanation in this regard will not be provided again.

TABLE 3

| 3rd example | | | |
|---|---|---|---|
| D1 (mm) | 4.1 | α2 (degree) | 10 |
| D2 (mm) | 4.72 | (ψ4−ψ2)/2 (mm) | 0.535 |
| D3 (mm) | 4.9 | |ψ4−D|/2 (mm) | 0.01 |
| D (mm) | 4.23 | (π^2) × ((ψ4−ψ2)/D) | 2.497 |
| ψ2 (mm) | 3.18 | ψi/D | 0.511 |
| ψ4 (mm) | 4.25 | ψ4/D1 | 1.037 |
| ψi (mm) | 2.16 | (π^2) × w4/D2 | 0.23 |
| w4 (mm) | 0.11 | (ψ4−ψ2)/(2 × w4) | 4.864 |
| α1 (degree) | 30 | | |

4TH EXAMPLE

Figure 4A:
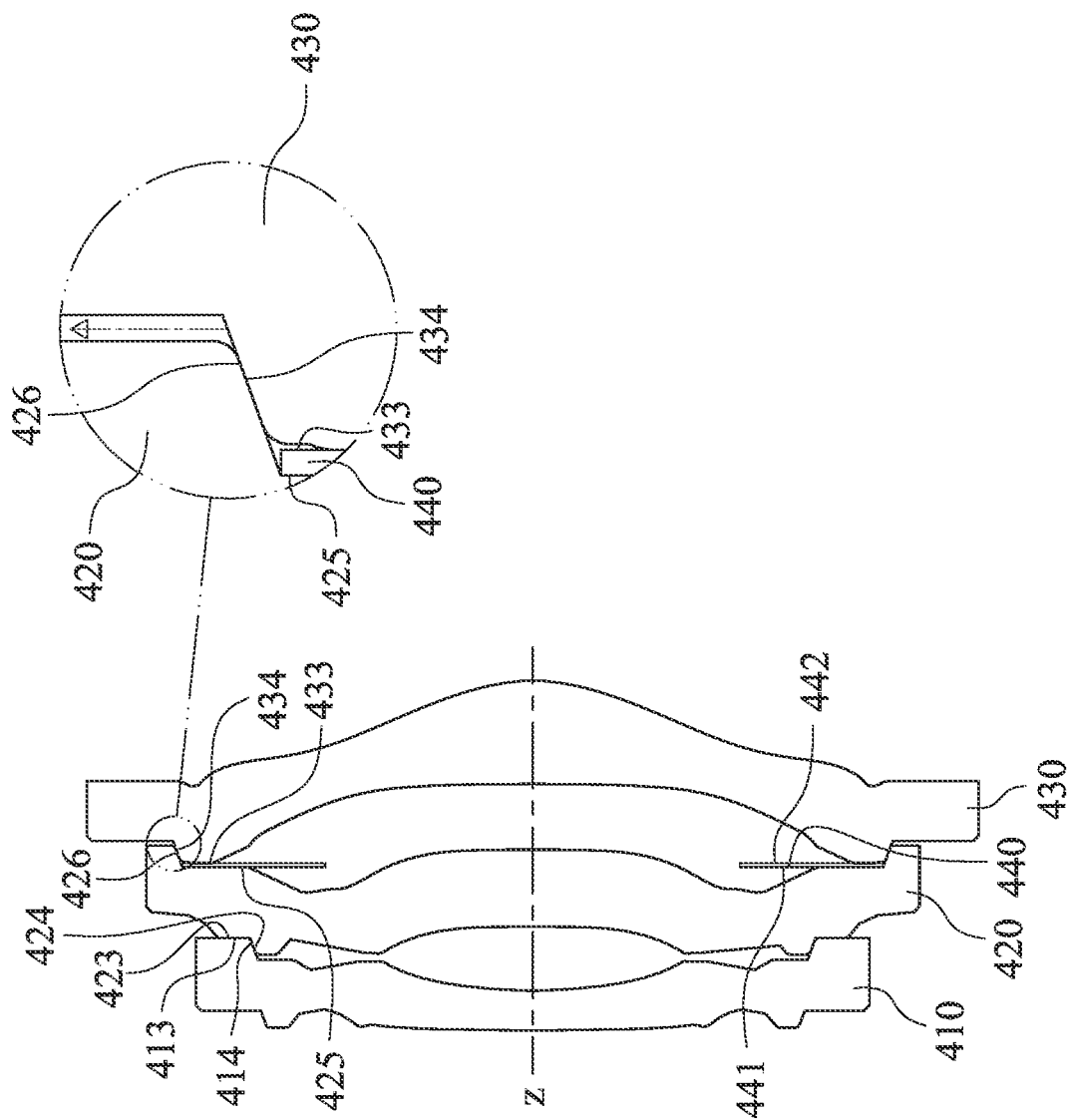
FIG. 4A is a schematic view of an imaging lens set according to the 4th example of the present disclosure.
Figure 4B:
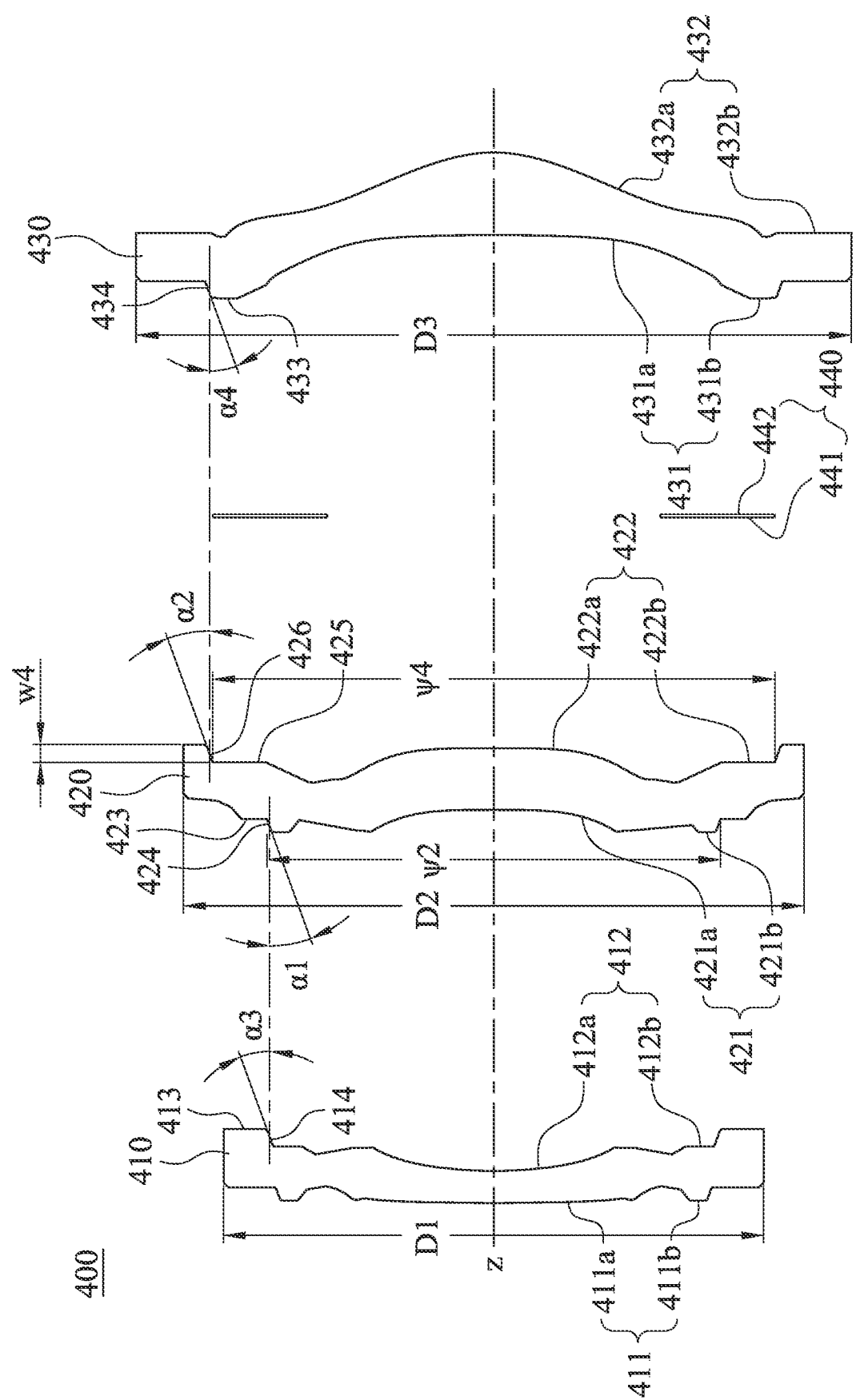
FIG. 4B is an exploded view of the imaging lens set in FIG. 4A.

FIG. 4A is a schematic view of an imaging lens set 400 according to the 4th example of the present disclosure, FIG. 4B is an exploded view of the imaging lens set 400 in FIG. 4A, and FIG. 4C is a cross-sectional view of a light blocking sheet 440 of the imaging lens set 400 in FIG. 4A. In FIG. 4A, the imaging lens set 400 of the 4th example includes three plastic lens elements and a light blocking sheet, in which the imaging lens set 400 has a central axis z. In particular, the three plastic lens elements include a first lens element 410, a second lens element 420 and a third lens element 430 which are arranged along the central axis z of the imaging lens set 400 in order from an object side to an image side. The light blocking sheet 440 is disposed between the second lens element 420 and the third lens element 430. More particularly, the light blocking sheet 440 has a central opening 444 (shown in FIG. 4C) which is coaxial with the first lens element 410, the second lens element 420 and the third lens element 430.

In FIG. 4B, the first lens element 410 includes the object-side surface 411 and the image-side surface 412 disposed relative to the object-side surface 411. The second lens element 420 includes the object-side surface 421 and the image-side surface 422. The third lens element 430 includes the object-side surface 431 and the image-side surface 432. The light blocking sheet 440 includes the object-side surface 441 and the image-side surface 442.

In details, the object-side surface 411 of the first lens element 410 includes an effective optical section 411a and a lens peripheral section 411b which are arranged from the central axis z to the edge thereof, and the image-side surface 412 of the first lens element 410 includes an effective optical section 412a and a lens peripheral section 412b which are arranged from the central axis z to the edge thereof. The object-side surface 421 of the second lens element 420 includes an effective optical section 421a and a lens peripheral section 421b which are arranged from the central axis z to the edge thereof, and the image-side surface 422 of the second lens element 420 includes an effective optical section 422a and a lens peripheral section 422b which are arranged from the central axis z to the edge thereof. The object-side surface 431 of the third lens element 430 includes an effective optical section 431a and a lens peripheral section 431b which are arranged from the central axis z to the edge thereof, and the image-side surface 432 of the third lens element 430 includes an effective optical section 432a and a lens peripheral section 432b which are arranged from the central axis z to the edge thereof.

In the 4th example, the first lens element 410 includes a first flat abutting portion 413 and a first conical surface 414. The first flat abutting portion 413 and the first conical surface 414 are both disposed on the image-side surface 412 of the first lens element 410, and the first conical surface 414 is closer to the central axis z than the first flat abutting portion 413 thereto. The second lens element 420 includes a second flat abutting portion 423, a second conical surface 424, a fourth flat abutting portion 425 and a fourth conical surface 426. The second flat abutting portion 423 and the second conical surface 424 are both disposed on the object-side surface 421 of the second lens element 420, and the second conical surface 424 is closer to the central axis z than the second flat abutting portion 423 thereto. The fourth flat abutting portion 425 and the fourth conical surface 426 are both disposed on the image-side surface 422 of the second lens element 420, and the fourth conical surface 426 is farer away from the central axis z than the fourth flat abutting portion 425 to the central axis z. The third lens element 430 includes a third flat abutting portion 433 and a third conical surface 434. The third flat abutting portion 433 and the third conical surface 434 are both disposed on the object-side surface 431 of the third lens element 430, and the third conical surface 434 is farer away from the central axis z than the third flat abutting portion 433 to the central axis z.

As shown in FIG. 4A, the first flat abutting portion 413 is abutted with the second flat abutting portion 423, the first conical surface 414 contacts with the second conical surface 424. Thus, the first lens element 410 and the second lens element 420 are assembled with each other and aligned to the central axis z of the imaging lens set 400. The fourth conical surface 426 contacts with the third conical surface 434, and the object-side surface 441 of the light blocking sheet 440 is abutted with the fourth flat abutting portion 425, and the image-side surface 442 of the light blocking sheet 440 is abutted with the third flat abutting portion 433. Thus, the second lens element 420 and the third lens element 430 are assembled with each other and aligned to the central axis z of the imaging lens set 400. As shown in a partial enlarged diagram of FIG. 4A, a part of the third conical surface 434 is not overlapped with the second lens element 420 along a direction perpendicular to and away from the central axis z. That is, an air gap is arranged between the edge of the second lens element 420 and the edge of the third lens element 430 in a direction perpendicular to the central axis z. Thus, the roundness of single lens element will not affect the fit of the lens elements.

In FIG. 4B, an angle α1 between the second conical surface 424 and the central axis z is disposed corresponding to an angle between the first conical surface 414 and the central axis z, that is, α3, for assembling with each other. Similarly, an angle α2 between the fourth conical surface 426 and the central axis z is disposed corresponding to an angle, that is, α4, between the third conical surface 434 and the central axis z for assembling with each other.

As shown in FIG. 4C, the light blocking sheet 440 has the central axis z. The object-side surface 441 and the image-side surface 442 of the light blocking sheet 440 further includes an outer diameter surface 443 and a central opening 444. The central axis z passes through the central opening 444. The outer diameter surface 443 connects the object-side surface 441 with the image-side surface 442 of the light blocking sheet 440 and is coaxially with the central opening 444. The central opening 444 is surrounded by an inner surface 444a thereof. In particular, the inner surface 444a of the central opening 444 of the light blocking sheet 440 is circular. More particularly, a diameter of the central opening 444 of the light blocking sheet 440 on the object-side surface 441 is equal to a diameter of the central opening 444 on the image-side surface 442.

The data of the parameters D1, D2, D3, D, ψ2, ψ4, ψi, w4, α1, α2, (ψ4−ψ2)/2, |ψ4−D|/2, (π^2)×((ψ4−ψ2)/D), ψi/D, ψ4/D1, (π^2)×w4/D2 and (ψ4−ψ2)/(2×w4) of the imaging lens set 400 according to the 4th example of the present disclosure are listed in the following Table 4. The definitions of these parameters shown in Table 4 are the same as those stated in the imaging lens set 100 of the 1st example shown in FIG. 4B and FIG. 4C, so an explanation in this regard will not be provided again.

TABLE 4

| 4th example | | | |
|---|---|---|---|
| D1 (mm) | 3.7 | α2 (degree) | 20 |
| D2 (mm) | 4.25 | (ψ4−ψ2)/2 (mm) | 0.37 |
| D3 (mm) | 4.9 | \|ψ4−D\|/2 (mm) | 0 |
| D (mm) | 3.85 | (π^2) × ((ψ4−ψ2)/D) | 1.895 |
| ψ2 (mm) | 3.11 | ψi/D | 0.592 |
| ψ4 (mm) | 3.85 | ψ4/D1 | 1.041 |
| ψi (mm) | 2.28 | (π^2) × w4/D2 | 0.278 |
| w4 (mm) | 0.12 | (ψ4−ψ2)/(2 × w4) | 3.083 |
| α1 (degree) | 20 | | |

5TH EXAMPLE

Figure 5A:
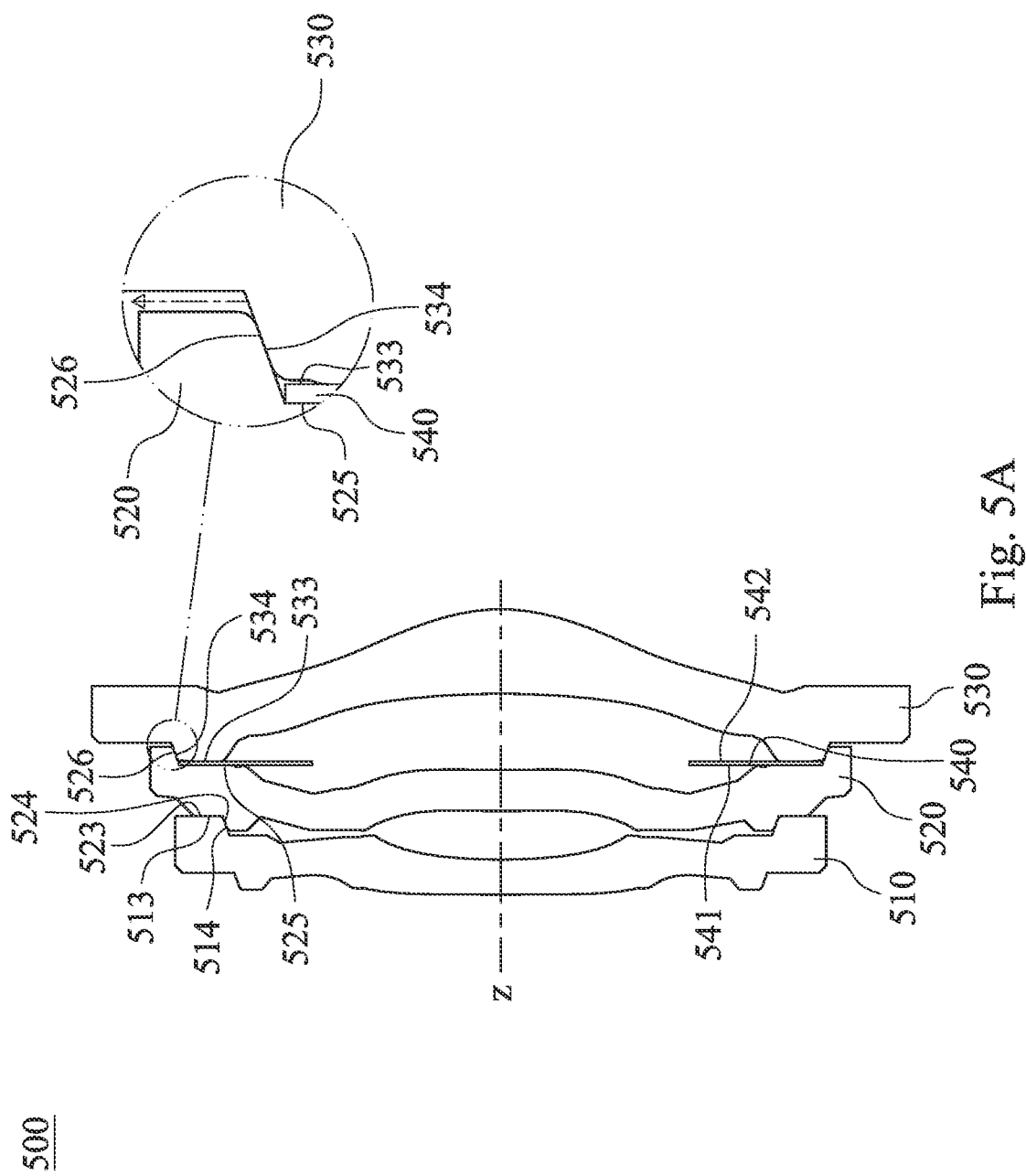
FIG. 5A is a schematic view of an imaging lens set according to the 5th example of the present disclosure.
Figure 5B:
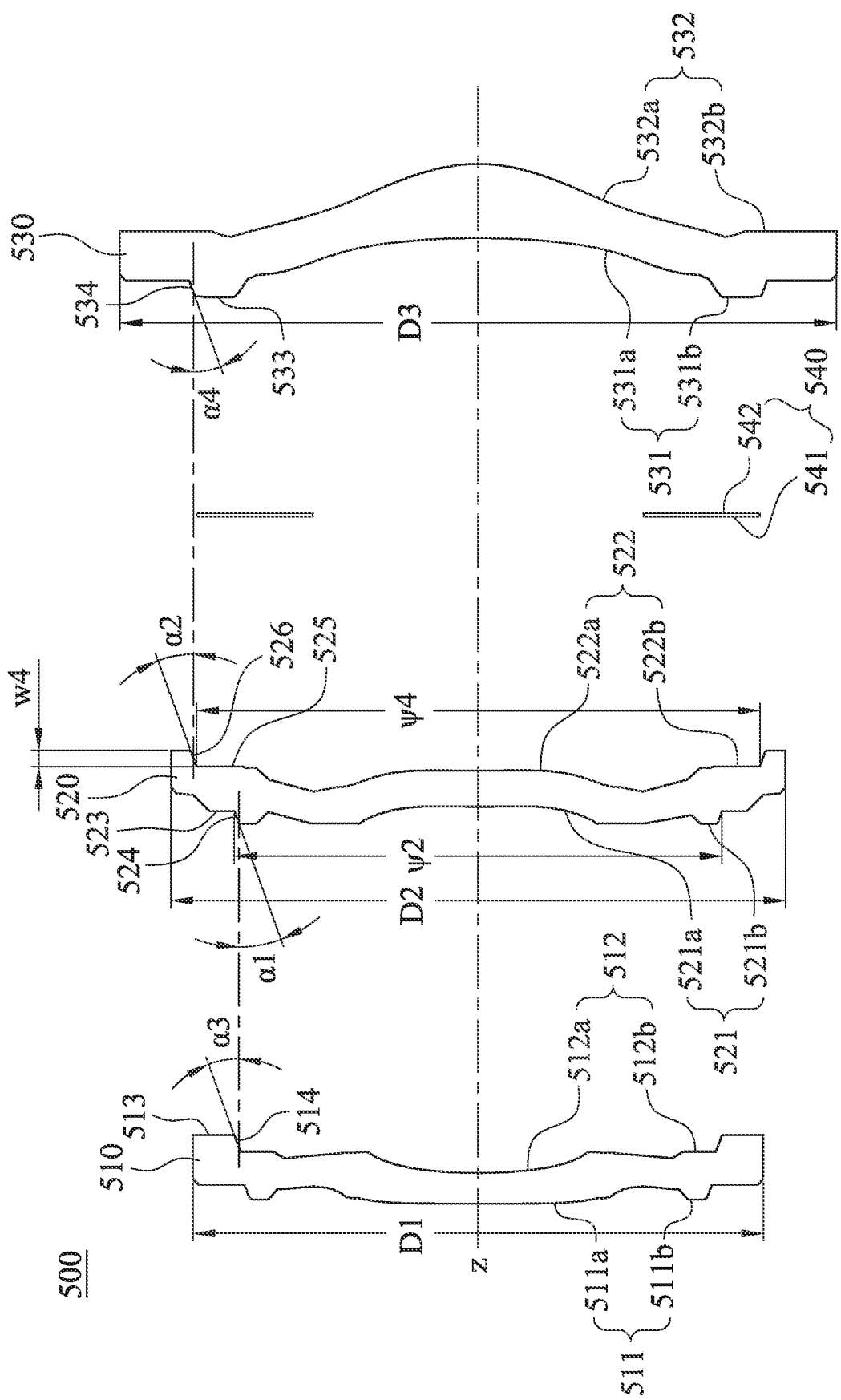
FIG. 5B is an exploded view of the imaging lens set in FIG. 5A.

FIG. 5A is a schematic view of an imaging lens set 500 according to the 5th example of the present disclosure, FIG. 5B is an exploded view of the imaging lens set 500 in FIG. 5A, and FIG. 5C is a cross-sectional view of a light blocking sheet 540 of the imaging lens set 500 in FIG. 5A. In FIG. 5A, the imaging lens set 500 of the 5th example includes three plastic lens elements and a light blocking sheet, in which the imaging lens set 500 has a central axis z. In particular, the three plastic lens elements include a first lens element 510, a second lens element 520 and a third lens element 530 which are arranged along the central axis z of the imaging lens set 500 from an object side to an image side. The light blocking sheet 540 is disposed between the second lens element 520 and the third lens element 530. More particularly, the light blocking sheet 540 has a central opening 544 (shown in FIG. 5C) which is coaxial with the first lens element 510, the second lens element 520 and the third lens element 530.

In FIG. 5B, the first lens element 510 includes the object-side surface 511 and the image-side surface 512 disposed relative to the object-side surface 511. The second lens element 520 includes the object-side surface 521 and the image-side surface 522. The third lens element 530 includes the object-side surface 531 and the image-side surface 532. The light blocking sheet 540 includes the object-side surface 541 and the image-side surface 542.

In details, the object-side surface 511 of the first lens element 510 includes an effective optical section 511a and a lens peripheral section 511b which are arranged from the central axis z to the edge thereof, and the image-side surface 512 of the first lens element 510 includes an effective optical section 512a and a lens peripheral section 512b which are arranged from the central axis z to the edge thereof. The object-side surface 521 of the second lens element 520 includes an effective optical section 521a and a lens peripheral section 521b which are arranged from the central axis z to the edge thereof, and the image-side surface 522 of the second lens element 520 includes an effective optical section 522a and a lens peripheral section 522b which are arranged from the central axis z to the edge thereof. The object-side surface 531 of the third lens element 530 includes an effective optical section 531a and a lens peripheral section 531b which are arranged from the central axis z to the edge thereof, and the image-side surface 532 of the third lens element 530 includes an effective optical section 532a and a lens peripheral section 532b which are arranged from the central axis z to the edge thereof.

In the 5th example, the first lens element 510 includes a first flat abutting portion 513 and a first conical surface 514. The first flat abutting portion 513 and the first conical surface 514 are both disposed on the image-side surface 512 of the first lens element 510, and the first conical surface 514 is closer to the central axis z than the first flat abutting portion 513 thereto. The second lens element 520 includes a second flat abutting portion 523, a second conical surface 524, a fourth flat abutting portion 525 and a fourth conical surface 526. The second flat abutting portion 523 and the second conical surface 524 are both disposed on the object-side surface 521 of the second lens element 520, and the second conical surface 524 is closer to the central axis z than the second flat abutting portion 523 thereto. The fourth flat abutting portion 525 and the fourth conical surface 526 are both disposed on the image-side surface 522 of the second lens element 520, and the fourth conical surface 526 is farer away from the central axis z than the fourth flat abutting portion 525 to the central axis z. The third lens element 530 includes a third flat abutting portion 533 and a third conical surface 534. The third flat abutting portion 533 and the third conical surface 534 are both disposed on the object-side surface 531 of the third lens element 530, and the third conical surface 534 is farer away from the central axis z than the third flat abutting portion 533 to the central axis z.

As shown in FIG. 5A, the first flat abutting portion 513 is abutted with the second flat abutting portion 523, the first conical surface 514 contacts with the second conical surface 524. Thus, the first lens element 510 and the second lens element 520 are assembled with each other and aligned to the central axis z of the imaging lens set 500. The fourth conical surface 526 contacts with the third conical surface 534, and the object-side surface 541 of the light blocking sheet 540 is abutted with the fourth flat abutting portion 525, and the image-side surface 542 of the light blocking sheet 540 is abutted with the third flat abutting portion 533. Thus, the second lens element 520 and the third lens element 530 are assembled with each other and aligned to the central axis z of the imaging lens set 500. As shown in a partial enlarged diagram of FIG. 5A, a part of the third conical surface 534 is not overlapped with the second lens element 520 along a direction perpendicular to and away from the central axis z. That is, an air gap is arranged between the edge of the second lens element 520 and the edge of the third lens element 530 in a direction perpendicular to the central axis z. Thus, the roundness of single lens element will not affect the fit of the lens elements.

In FIG. 5B, an angle α1 between the second conical surface 524 and the central axis z is disposed corresponding to an angle between the first conical surface 514 and the central axis z, that is, α3, for assembling with each other. Similarly, an angle α2 between the fourth conical surface 526 and the central axis z is disposed corresponding to an angle, that is, α4, between the third conical surface 534 and the central axis z for assembling with each other.

As shown in FIG. 5C, the light blocking sheet 540 has the central axis z. The object-side surface 541 and the image-side surface 542 of the light blocking sheet 540 further includes an outer diameter surface 543 and a central opening 544. The central axis z passes through the central opening 544. The outer diameter surface 543 connects the object-side surface 541 with the image-side surface 542 of the light blocking sheet 540 and is coaxially with the central opening 544. The central opening 544 is surrounded by an inner surface 544a thereof. In particular, the inner surface 544a of the central opening 544 of the light blocking sheet 540 is circular. More particularly, a diameter of the central opening 544 of the light blocking sheet 540 on the object-side surface 541 is equal to a diameter of the central opening 544 on the image-side surface 542.

The data of the parameters D1, D2, D3, D, ψ2, ψ4, ψi, w4, α1, α2, (ψ4−ψ2)/2, |ψ4−D|/2, (π^2)×((ψ4−ψ2)/D), ψi/D, ψ4/D1, (π^2)×w4/D2 and (ψ4−ψ2)/(2×w4) of the imaging lens set 500 according to the 5th example of the present disclosure are listed in the following Table 5. The definitions of these parameters shown in Table 5 are the same as those stated in the imaging lens set 100 of the 1st example shown in FIG. 5B and FIG. 5C, so an explanation in this regard will not be provided again.

TABLE 5

| 5th example | | | |
|---|---|---|---|
| D1 (mm) | 3.9 | α2 (degree) | 20 |
| D2 (mm) | 4.2 | (ψ4−ψ2)/2 (mm) | 0.26 |
| D3 (mm) | 4.9 | |ψ4−D|/2 (mm) | 0 |
| D (mm) | 3.85 | (π^2) × ((ψ4−ψ2)/D) | 1.332 |
| ψ2 (mm) | 3.33 | ψi/D | 0.587 |
| ψ4 (mm) | 3.85 | ψ4/D1 | 0.987 |
| ψi (mm) | 2.26 | (π^2) × w4/D2 | 0.259 |
| w4 (mm) | 0.11 | (ψ4−ψ2)/(2 × w4) | 2.364 |
| α1 (degree) | 20 | | |

6TH EXAMPLE

Figure 6:
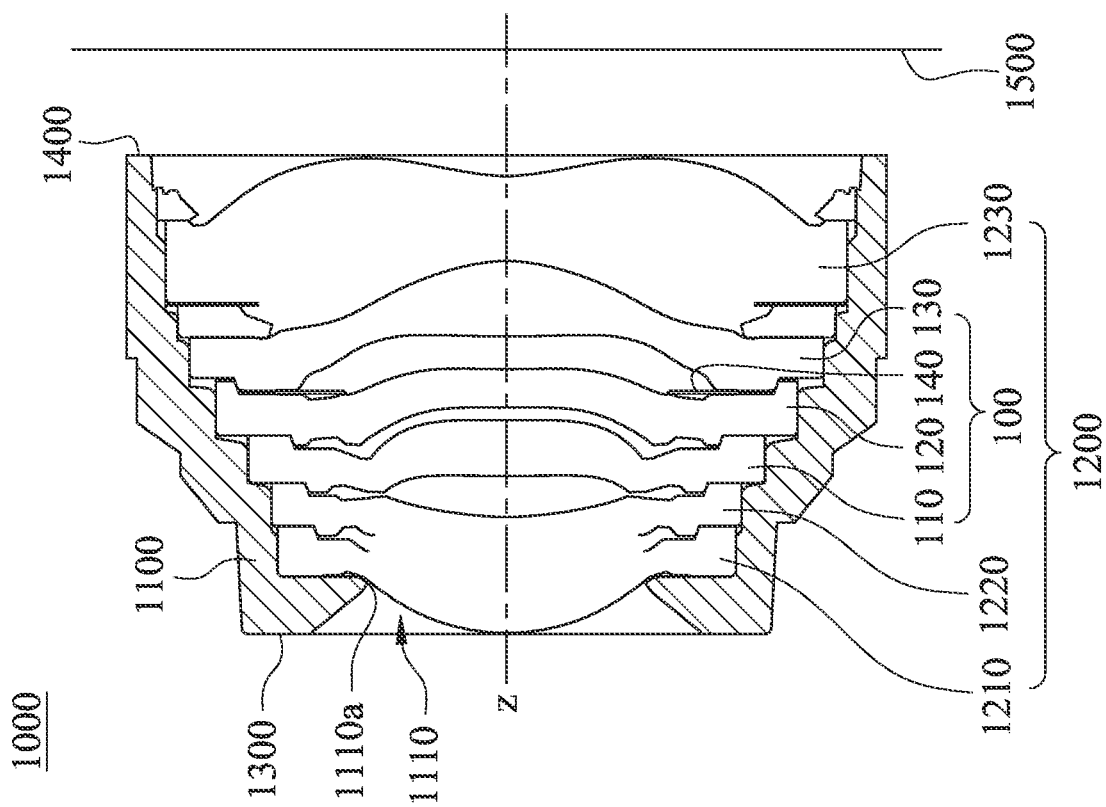
FIG. 6 is a cross-sectional view of an imaging lens module according to the 6th example of the present disclosure.

FIG. 6 is a cross-sectional view of an imaging lens module 1000 according to the 6th example of the present disclosure. In FIG. 6, the imaging lens module 1000 includes a plastic barrel 1100 and an optical lens assembly 1200 disposed in the plastic barrel 1100. The optical lens assembly 1200 of the 6th example includes the imaging lens set 100 according to the 1st example of the present disclosure.

The plastic barrel 1100 includes a barrel hole 1110, and the barrel hole 1110 includes a minimum inner diameter position 1110a for suppressing the stray light and improving the image quality of the imaging lens module 1000. Moreover, the minimum inner diameter position 1110a of the barrel hole 1110 can be an aperture stop of the imaging lens module 1000. Therefore, it is favorable for simplifying the mechanical design of the imaging lens module 1000.

The imaging lens module 1000 further includes an object-side end 1300, an image-side end 1400 and an image surface 1500. The object-side end 1300 faces towards an imaged object (not shown), and the image-side end 1400 faces towards the image surface 1500.

The optical lens assembly 1200 is disposed in the plastic barrel 1100 along an optical axis of the imaging lens module 1000, which is coaxially with the central axis z of the imaging lens set 100, and includes a lens element 1210, a lens element 1220, the first lens element 110, the second lens element 120, and the third lens element 130 of the 1st example and a lens element 1230 in order from the object-side end 1300 to the image-side end 1400. The optical lens assembly 1200 further includes the light blocking sheet 140 of the 1st example, and the light blocking sheet 140 is disposed between the second lens element 120 and the third lens element 130 for further suppressing the stray light and improving the image quality of the imaging lens module 1000.

The structural features of the first lens element 110, the second lens element 120, the third lens element 130 and the light blocking sheet 140 of the imaging lens set 100 according to the 1st example can be referred back to FIG. 1A. In short, the first lens element 110 includes a first flat abutting portion 113 and a first conical surface 114. The first flat abutting portion 113 and the first conical surface 114 are both disposed on the image-side surface 112 of the first lens element 110, and the first conical surface 114 is closer to the central axis z than the first flat abutting portion 113 thereto. The second lens element 120 includes a second flat abutting portion 123, a second conical surface 124, a fourth flat abutting portion 125 and a fourth conical surface 126. The second flat abutting portion 123 and the second conical surface 124 are both disposed on the object-side surface 121 of the second lens element 120, and the second conical surface 124 is closer to the central axis z than the second flat abutting portion 123 thereto. The fourth flat abutting portion 125 and the fourth conical surface 126 are both disposed on the image-side surface 122 of the second lens element 120, and the fourth conical surface 126 is farer away from the central axis z than the fourth flat abutting portion 125 to the central axis z. The third lens element 130 includes a third flat abutting portion 133 and a third conical surface 134. The third flat abutting portion 133 and the third conical surface 134 are both disposed on the object-side surface 131 of the third lens element 130, and the third conical surface 134 is farer away from the central axis z than the third flat abutting portion 133 to the central axis z.

The first flat abutting portion 113 is abutted with the second flat abutting portion 123, the first conical surface 114 contacts with the second conical surface 124, and thus the first lens element 110 is assembled with the second lens element 120. In the meanwhile, the fourth conical surface 126 contacts with the third conical surface 134, and the object-side surface 141 of the light blocking sheet 140 is abutted with the fourth flat abutting portion 125, and the image-side surface 142 of the light blocking sheet 140 is abutted with the third flat abutting portion 133, thus, the second lens element 120 is assembled with the third lens element 130. As shown in FIG. 6, through the structural designs of the object-side surface 111 of the first lens element 110 and the image-side surface 132 of the third lens element 130, the lens element 1220 and the lens element 1230 are assembled with the imaging lens set 100 and aligned to the central axis z of the imaging lens set 100. Other details of the imaging lens set 100 has been described in the 1st example and will not be described again herein.

Moreover, the lens element 1210, the lens element 1220 and the lens element 1230 of the optical lens assembly 1200 can be made of plastic or glass materials. When the lens element is made of the plastic material, manufacturing costs can be effectively reduced. When the lens elements are made of glass materials, the distribution of the refractive power of the optical lens assembly 1200 may be more flexible to design. Moreover, the optical lens assembly 1200 can include other optical elements (their reference numerals are omitted), such as spacers, light blocking sheets and so on.

7TH EXAMPLE

Figure 7:
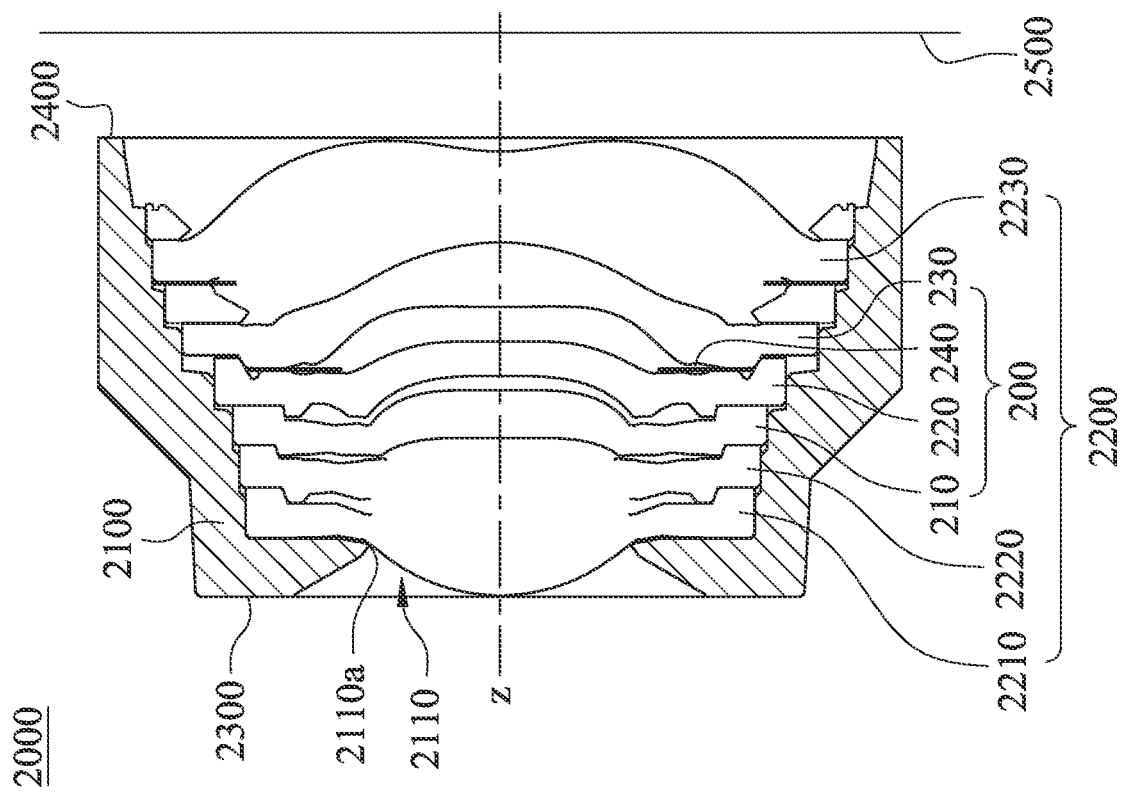
FIG. 7 is a cross-sectional view of an imaging lens module according to the 7th example of the present disclosure.

FIG. 7 is a cross-sectional view of an imaging lens module 2000 according to the 7th example of the present disclosure. In FIG. 7, the imaging lens module 2000 includes a plastic barrel 2100 and an optical lens assembly 2200 disposed in the plastic barrel 2100. The optical lens assembly 2200 of the 7th example includes the imaging lens set 200 according to the 2nd example of the present disclosure.

The plastic barrel 2100 includes a barrel hole 2110, and the barrel hole 2110 includes a minimum inner diameter position 2110a for suppressing the stray light and improving the image quality of the imaging lens module 2000. Moreover, the minimum inner diameter position 2110a of the barrel hole 2110 can be an aperture stop of the imaging lens module 2000. Therefore, it is favorable for simplifying the mechanical design of the imaging lens module 2000.

The imaging lens module 2000 further includes an object-side end 2300, an image-side end 2400 and an image surface 2500. The object-side end 2300 faces towards an imaged object (not shown), and the image-side end 2400 faces towards the image surface 2500.

The optical lens assembly 2200 is disposed in the plastic barrel 2100 along an optical axis of the imaging lens module 2000, which is coaxially with the central axis z of the imaging lens set 200, and includes a lens element 2210, a lens element 2220, the first lens element 210, the second lens element 220, and the third lens element 230 of the 2nd example and a lens element 2230 in order from the object-side end 2300 to the image-side end 2400. The optical lens assembly 2200 further includes the light blocking sheet 240 of the 2nd example, and the light blocking sheet 240 is disposed between the second lens element 220 and the third lens element 230 for further suppressing the stray light and improving the image quality of the imaging lens module 2000.

The structural features of the first lens element 210, the second lens element 220, the third lens element 230 and the light blocking sheet 240 of the imaging lens set 200 according to the 2nd example can be referred back to FIG. 2A. The first lens element 210 includes a first flat abutting portion 213 and a first conical surface 214. The first flat abutting portion 213 and the first conical surface 214 are both disposed on the image-side surface 212 of the first lens element 210, and the first conical surface 214 is closer to the central axis z than the first flat abutting portion 213 thereto. The second lens element 220 includes a second flat abutting portion 223, a second conical surface 224, a fourth flat abutting portion 225 and a fourth conical surface 226. The second flat abutting portion 223 and the second conical surface 224 are both disposed on the object-side surface 221 of the second lens element 220, and the second conical surface 224 is closer to the central axis z than the second flat abutting portion 223 thereto. The fourth flat abutting portion 225 and the fourth conical surface 226 are both disposed on the image-side surface 222 of the second lens element 220, and the fourth conical surface 226 is farer away from the central axis z than the fourth flat abutting portion 225 to the central axis z. The third lens element 230 includes a third flat abutting portion 233 and a third conical surface 234. The third flat abutting portion 233 and the third conical surface 234 are both disposed on the object-side surface 231 of the third lens element 230, and the third conical surface 234 is farer away from the central axis z than the third flat abutting portion 233 to the central axis z.

The first flat abutting portion 213 is abutted with the second flat abutting portion 223, the first conical surface 214 contacts with the second conical surface 224, and thus the first lens element 210 is assembled with the second lens element 220. In the meanwhile, the fourth conical surface 226 contacts with the third conical surface 234, and the object-side surface 241 of the light blocking sheet 240 is abutted with the fourth flat abutting portion 225, and the image-side surface 242 of the light blocking sheet 240 is abutted with the third flat abutting portion 233, thus, the second lens element 220 is assembled with the third lens element 230. As shown in FIG. 7, through the structural designs of the object-side surface 211 of the first lens element 210 and the image-side surface 232 of the third lens element 230, the lens element 2220 and the lens element 2230 are assembled with the imaging lens set 200 and aligned to the central axis z of the imaging lens set 200. Other details of the imaging lens set 200 has been described in the 2nd example and will not be described again herein.

8TH EXAMPLE

Figure 8:
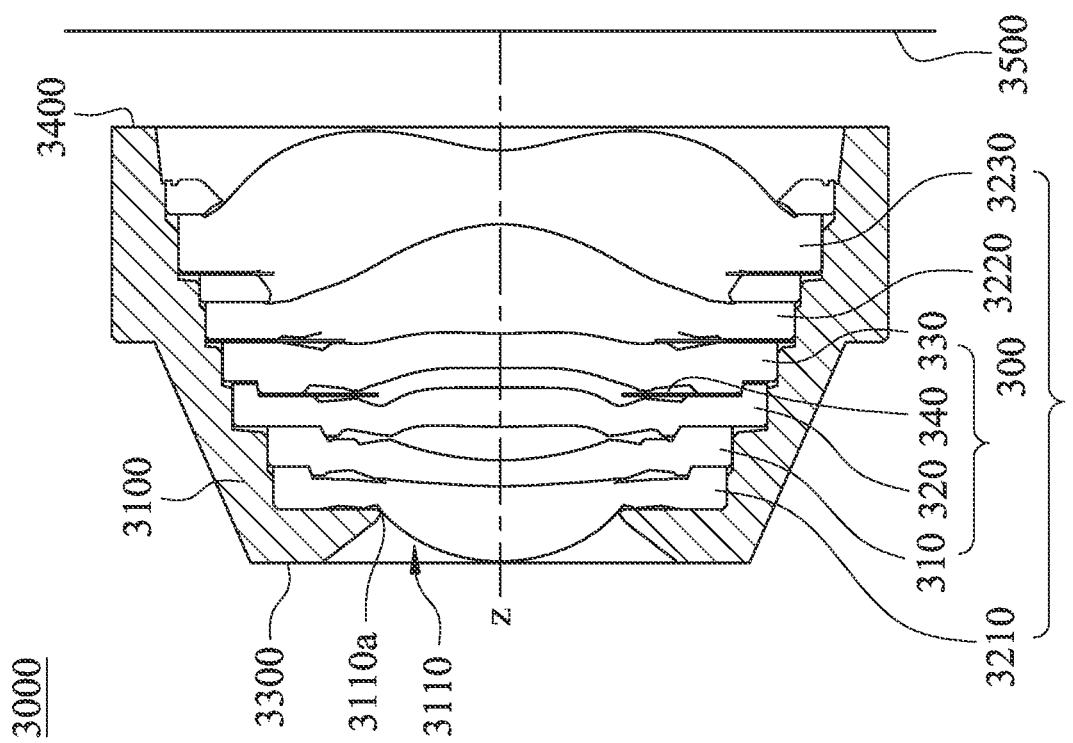
FIG. 8 is a cross-sectional view of an imaging lens module according to the 8th example of the present disclosure.

FIG. 8 is a cross-sectional view of an imaging lens module 3000 according to the 8th example of the present disclosure. In FIG. 8, the imaging lens module 3000 includes a plastic barrel 3100 and an optical lens assembly 3200 disposed in the plastic barrel 3100. The optical lens assembly 3200 of the 8th example includes the imaging lens set 300 according to the 3rd example of the present disclosure.

The plastic barrel 3100 includes a barrel hole 3110, and the barrel hole 3110 includes a minimum inner diameter position 3110a for suppressing the stray light and improving the image quality of the imaging lens module 3000. Moreover, the minimum inner diameter position 3110a of the barrel hole 3110 can be an aperture stop of the imaging lens module 3000. Therefore, it is favorable for simplifying the mechanical design of the imaging lens module 3000.

The imaging lens module 3000 further includes an object-side end 3300, an image-side end 3400 and an image surface 3500. The object-side end 3300 faces towards an imaged object (not shown), and the image-side end 3400 faces towards the image surface 3500. The optical lens assembly 3200 is disposed in the plastic barrel 3100 along an optical axis of the imaging lens module 3000, which is coaxially with the central axis z of the imaging lens set 300, and includes a lens element 3210, the first lens element 310, the second lens element 320, and the third lens element 330 of the 3rd example, a lens element 3220 and a lens element 3230 in order from the object-side end 3300 to the image-side end 3400. The optical lens assembly 3200 further includes the light blocking sheet 340 of the 3rd example, and the light blocking sheet 340 is disposed between the second lens element 320 and the third lens element 330 for further suppressing the stray light and improving the image quality of the imaging lens module 3000.

The structural features of the first lens element 310, the second lens element 320, the third lens element 330 and the light blocking sheet 340 of the imaging lens set 300 according to the 3rd example can be referred back to FIG. 3A. The first lens element 310 includes a first flat abutting portion 313 and a first conical surface 314. The first flat abutting portion 313 and the first conical surface 314 are both disposed on the image-side surface 312 of the first lens element 310, and the first conical surface 314 is closer to the central axis z than the first flat abutting portion 313 thereto. The second lens element 320 includes a second flat abutting portion 323, a second conical surface 324, a fourth flat abutting portion 325 and a fourth conical surface 326. The second flat abutting portion 323 and the second conical surface 324 are both disposed on the object-side surface 321 of the second lens element 320, and the second conical surface 324 is closer to the central axis z than the second flat abutting portion 323 thereto. The fourth flat abutting portion 325 and the fourth conical surface 326 are both disposed on the image-side surface 322 of the second lens element 320, and the fourth conical surface 326 is farer away from the central axis z than the fourth flat abutting portion 325 to the central axis z. The third lens element 330 includes a third flat abutting portion 333 and a third conical surface 334. The third flat abutting portion 333 and the third conical surface 334 are both disposed on the object-side surface 331 of the third lens element 330, and the third conical surface 334 is farer away from the central axis z than the third flat abutting portion 333 to the central axis z.

The first flat abutting portion 313 is abutted with the second flat abutting portion 323, the first conical surface 314 contacts with the second conical surface 324, and thus the first lens element 310 is assembled with the second lens element 320. In the meanwhile, the fourth conical surface 326 contacts with the third conical surface 334, and the object-side surface 341 of the light blocking sheet 340 is abutted with the fourth flat abutting portion 325, and the image-side surface 342 of the light blocking sheet 340 is abutted with the third flat abutting portion 333, thus, the second lens element 320 is assembled with the third lens element 330. As shown in FIG. 8, through the structural designs of the object-side surface 311 of the first lens element 310 and the image-side surface 332 of the third lens element 330, the lens element 3210 and the lens element 3220 are assembled with the imaging lens set 300 and aligned to the central axis z of the imaging lens set 300. Other details of the imaging lens set 300 has been described in the 3rd example and will not be described again herein.

9TH EXAMPLE

Figure 9:
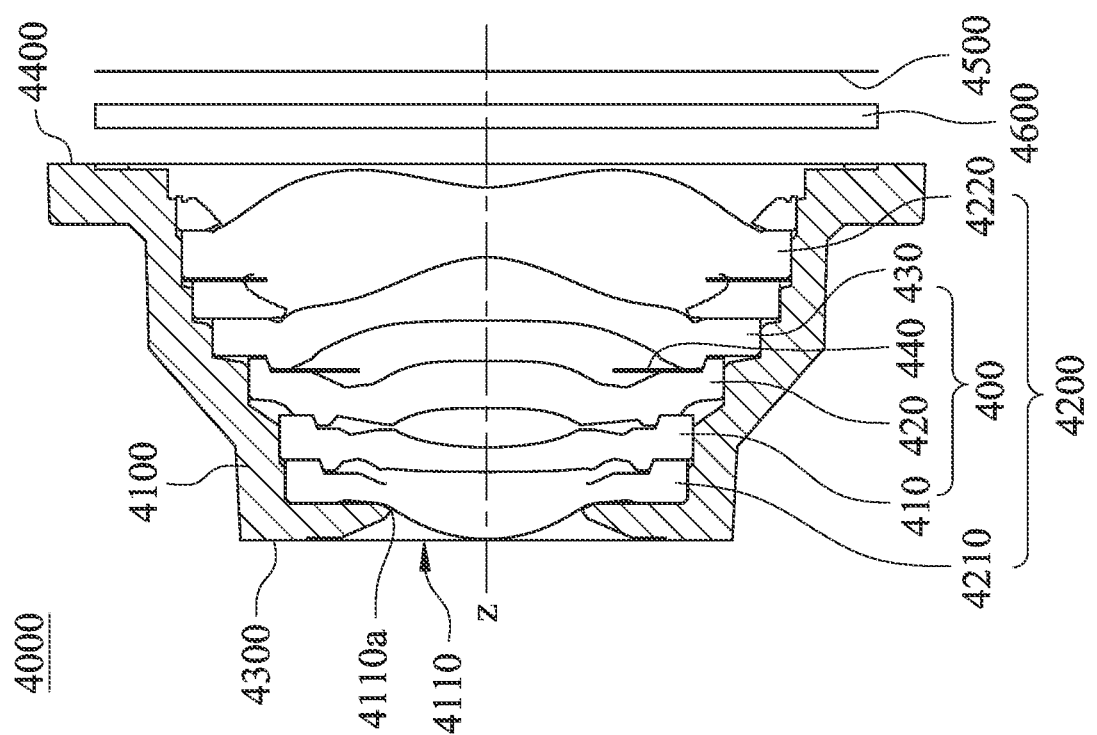
FIG. 9 is a cross-sectional view of an imaging lens module according to the 9th example of the present disclosure.

FIG. 9 is a cross-sectional view of an imaging lens module 4000 according to the 9th example of the present disclosure. In FIG. 9, the imaging lens module 4000 includes a plastic barrel 4100 and an optical lens assembly 4200 disposed in the plastic barrel 4100. The optical lens assembly 4200 of the 9th example includes the imaging lens set 400 according to the 4th example of the present disclosure.

The plastic barrel 4100 includes a barrel hole 4110, and the barrel hole 4110 includes a minimum inner diameter position 4110a for suppressing the stray light and improving the image quality of the imaging lens module 4000. Moreover, the minimum inner diameter position 4110a of the barrel hole 4110 can be an aperture stop of the imaging lens module 4000. Therefore, it is favorable for simplifying the mechanical design of the imaging lens module 4000.

The imaging lens module 4000 further includes an object-side end 4300, an image-side end 4400 and an image surface 4500. The object-side end 4300 faces towards an imaged object (not shown), and the image-side end 4400 faces towards the image surface 4500. In particular, the imaging lens module 4000 further includes a glass panel 4600 disposed between the image-side end 4400 and the image surface 4500. More particularly, the glass panel 4600 can be a cover glass, a filter or both above, and will not affect the focal length of the optical lens assembly 4200.

The optical lens assembly 4200 is disposed in the plastic barrel 4100 along an optical axis of the imaging lens module 4000, which is coaxially with the central axis z of the imaging lens set 400, and includes a lens element 4210, the first lens element 410, the second lens element 420, and the third lens element 430 of the 4th example and a lens element 4220 in order from the object-side end 4300 to the image-side end 4400. The optical lens assembly 4200 further includes the light blocking sheet 440 of the 4th example, and the light blocking sheet 440 is disposed between the second lens element 420 and the third lens element 430 for further suppressing the stray light and improving the image quality of the imaging lens module 4000.

The structural features of the first lens element 410, the second lens element 420, the third lens element 430 and the light blocking sheet 440 of the imaging lens set 400 according to the 4th example can be referred back to FIG. 4A. The first lens element 410 includes a first flat abutting portion 413 and a first conical surface 414. The first flat abutting portion 413 and the first conical surface 414 are both disposed on the image-side surface 412 of the first lens element 410, and the first conical surface 414 is closer to the central axis z than the first flat abutting portion 413 thereto. The second lens element 420 includes a second flat abutting portion 423, a second conical surface 424, a fourth flat abutting portion 425 and a fourth conical surface 426. The second flat abutting portion 423 and the second conical surface 424 are both disposed on the object-side surface 421 of the second lens element 420, and the second conical surface 424 is closer to the central axis z than the second flat abutting portion 423 thereto. The fourth flat abutting portion 425 and the fourth conical surface 426 are both disposed on the image-side surface 422 of the second lens element 420, and the fourth conical surface 426 is farer away from the central axis z than the fourth flat abutting portion 425 to the central axis z. The third lens element 430 includes a third flat abutting portion 433 and a third conical surface 434. The third flat abutting portion 433 and the third conical surface 434 are both disposed on the object-side surface 431 of the third lens element 430, and the third conical surface 434 is farer away from the central axis z than the third flat abutting portion 433 to the central axis z.

The first flat abutting portion 413 is abutted with the second flat abutting portion 423, the first conical surface 414 contacts with the second conical surface 424, and thus the first lens element 410 is assembled with the second lens element 420. In the meanwhile, the fourth conical surface 426 contacts with the third conical surface 434, and the object-side surface 441 of the light blocking sheet 440 is abutted with the fourth flat abutting portion 425, and the image-side surface 442 of the light blocking sheet 440 is abutted with the third flat abutting portion 433, thus, the second lens element 420 is assembled with the third lens element 430. As shown in FIG. 9, through the structural designs of the object-side surface 411 of the first lens element 410 and the image-side surface 432 of the third lens element 430, the lens element 4210 and the lens element 4220 are assembled with the imaging lens set 400 and aligned to the central axis z of the imaging lens set 400. Other details of the imaging lens set 400 has been described in the 4th example and will not be described again herein.

10TH EXAMPLE

Figure 10:
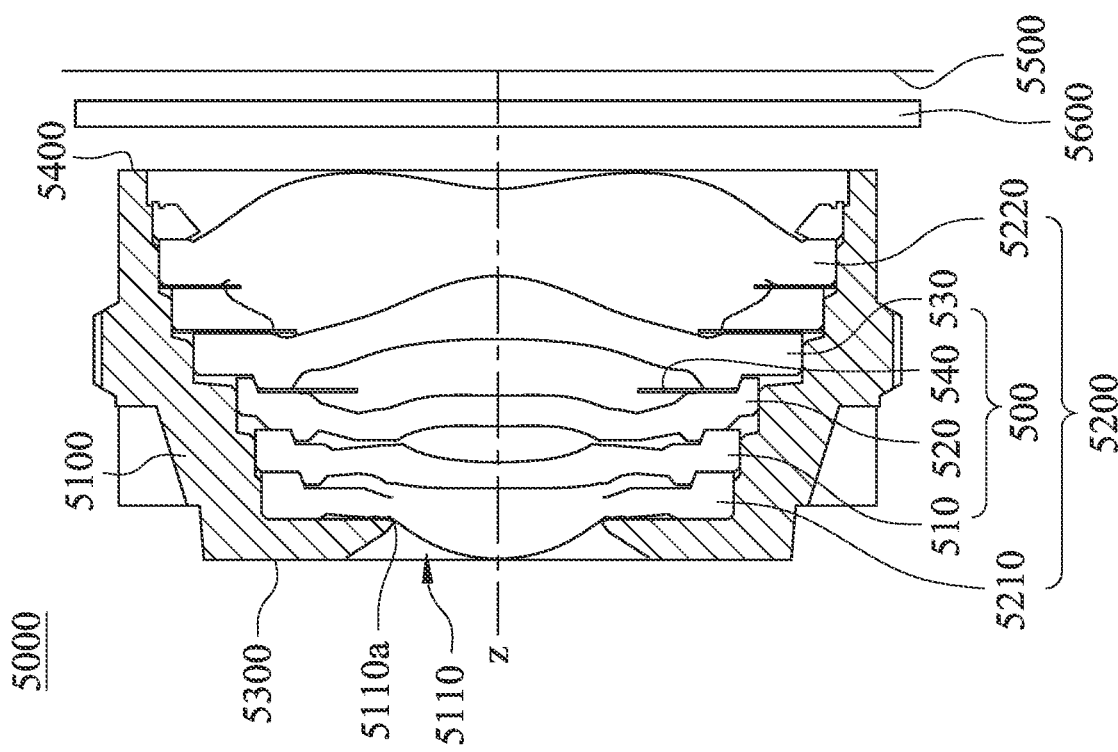
FIG. 10 is a cross-sectional view of an imaging lens module according to the 10th example of the present disclosure.

FIG. 10 is a cross-sectional view of an imaging lens module 5000 according to the 10th example of the present disclosure. In FIG. 10, the imaging lens module 5000 includes a plastic barrel 5100 and an optical lens assembly 5200 disposed in the plastic barrel 5100. The optical lens assembly 5200 of the 10th example includes the imaging lens set 500 according to the 5th example of the present disclosure.

The plastic barrel 5100 includes a barrel hole 5110, and the barrel hole 5110 includes a minimum inner diameter position 5110a for suppressing the stray light and improving the image quality of the imaging lens module 5000. Moreover, the minimum inner diameter position 5110a of the barrel hole 5110 can be an aperture stop of the imaging lens module 5000. Therefore, it is favorable for simplifying the mechanical design of the imaging lens module 5000.

The imaging lens module 5000 further includes an object-side end 5300, an image-side end 5400 and an image surface 5500. The object-side end 5300 faces towards an imaged object (not shown), and the image-side end 5400 faces towards the image surface 5500. In particular, the imaging lens module 5000 further includes a glass panel 5600 disposed between the image-side end 5400 and the image surface 5500. More particularly, the glass panel 5600 can be a cover glass, a filter or both above, and will not affect the focal length of the optical lens assembly 5200.

The optical lens assembly 5200 is disposed in the plastic barrel 5100 along an optical axis of the imaging lens module 5000, which is coaxially with the central axis z of the imaging lens set 500, and includes a lens element 5210, the first lens element 510, the second lens element 520, and the third lens element 530 of the 5th example and a lens element 5220 in order from the object-side end 5300 to the image-side end 5400. The optical lens assembly 5200 further includes the light blocking sheet 540 of the 5th example, and the light blocking sheet 540 is disposed between the second lens element 520 and the third lens element 530 for further suppressing the stray light and improving the image quality of the imaging lens module 5000.

The structural features of the first lens element 510, the second lens element 520, the third lens element 530 and the light blocking sheet 540 of the imaging lens set 500 according to the 5th example can be referred back to FIG. 5A. The first lens element 510 includes a first flat abutting portion 513 and a first conical surface 514. The first flat abutting portion 513 and the first conical surface 514 are both disposed on the image-side surface 512 of the first lens element 510, and the first conical surface 514 is closer to the central axis z than the first flat abutting portion 513 thereto. The second lens element 520 includes a second flat abutting portion 523, a second conical surface 524, a fourth flat abutting portion 525 and a fourth conical surface 526. The second flat abutting portion 523 and the second conical surface 524 are both disposed on the object-side surface 521 of the second lens element 520, and the second conical surface 524 is closer to the central axis z than the second flat abutting portion 523 thereto. The fourth flat abutting portion 525 and the fourth conical surface 526 are both disposed on the image-side surface 522 of the second lens element 520, and the fourth conical surface 526 is farer away from the central axis z than the fourth flat abutting portion 525 to the central axis z. The third lens element 530 includes a third flat abutting portion 533 and a third conical surface 534. The third flat abutting portion 533 and the third conical surface 534 are both disposed on the object-side surface 531 of the third lens element 530, and the third conical surface 534 is farer away from the central axis z than the third flat abutting portion 533 to the central axis z.

The first flat abutting portion 513 is abutted with the second flat abutting portion 523, the first conical surface 514 contacts with the second conical surface 524, and thus the first lens element 510 is assembled with the second lens element 520. In the meanwhile, the fourth conical surface 526 contacts with the third conical surface 534, and the object-side surface 541 of the light blocking sheet 540 is abutted with the fourth flat abutting portion 525, and the image-side surface 542 of the light blocking sheet 540 is abutted with the third flat abutting portion 533, thus, the second lens element 520 is assembled with the third lens element 530. As shown in FIG. 10, through the structural designs of the object-side surface 511 of the first lens element 510 and the image-side surface 532 of the third lens element 530, the lens element 5210 and the lens element 5220 are assembled with the imaging lens set 500 and aligned to the central axis z of the imaging lens set 500. Other details of the imaging lens set 500 has been described in the 5th example and will not be described again herein.

11TH EXAMPLE

Figure 11A:
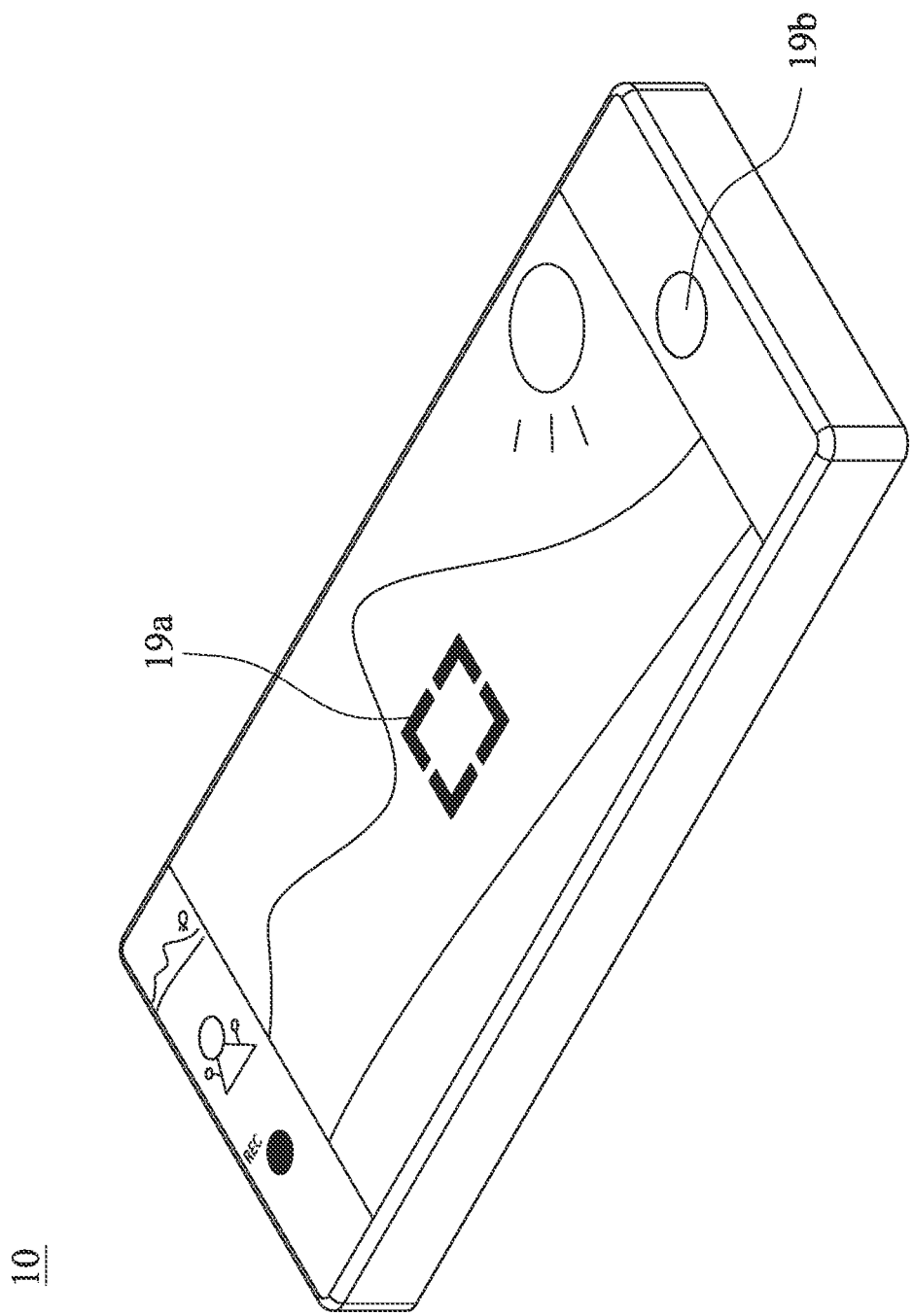
FIG. 11A is a schematic view of an electronic device according to the 11th example of the present disclosure.
Figure 11B:
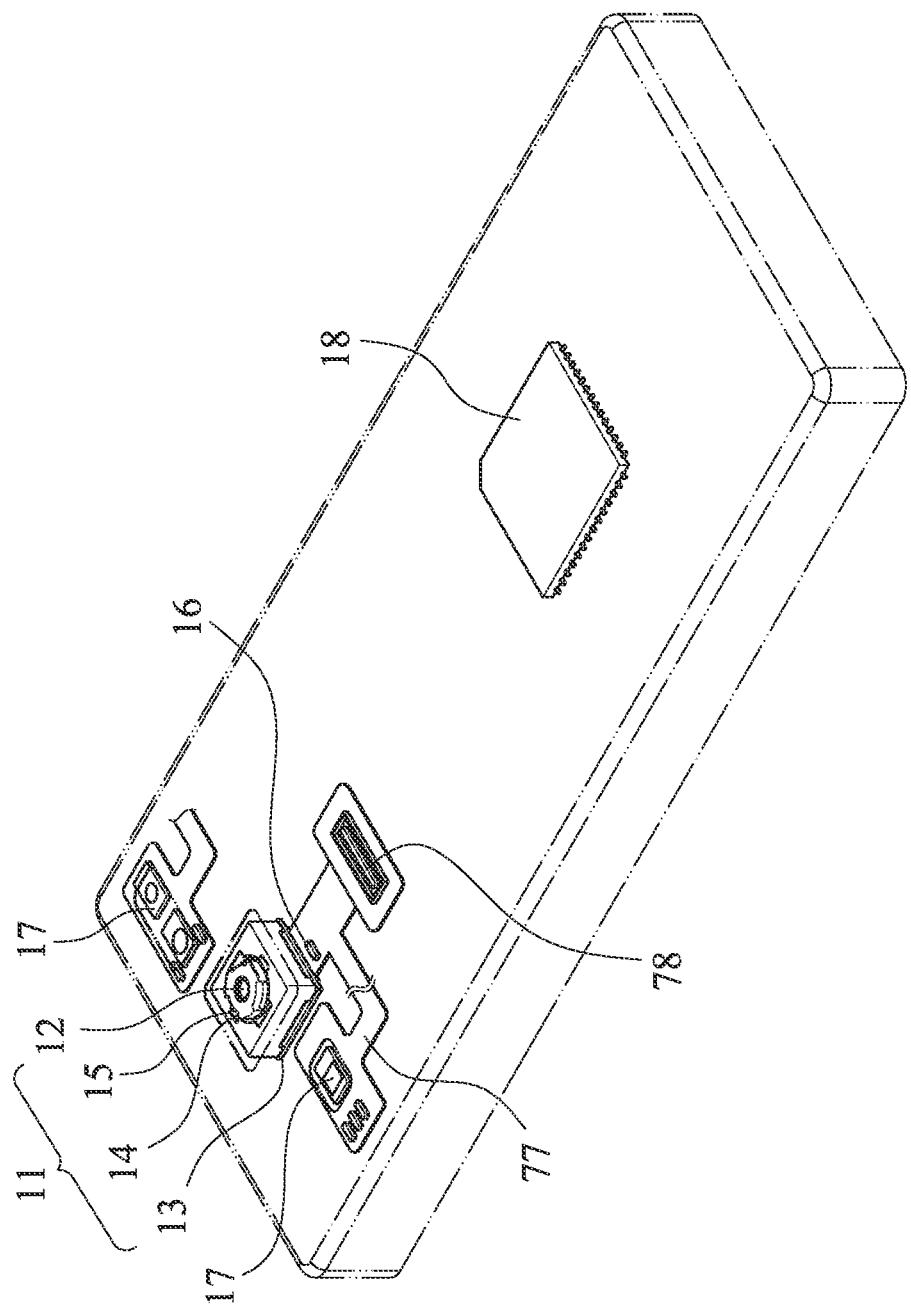
FIG. 11B is another schematic view of the electronic device of the 11th example.

Please refer to FIG. 11A and FIG. 11B. FIG. 11A is a schematic view of an electronic device 10 according to the 11th example of the present disclosure, FIG. 11B is another schematic view of the electronic device 10 of the 11th example, and particularly, FIG. 11A and FIG. 11B are schematic views related to a camera of the electronic device 10. In FIG. 11A and FIG. 11B, the electronic device 10 of the 11th example is a smart phone, wherein the electronic device 10 includes a camera module 11. The camera module 11 includes an imaging lens module 12 according to the present disclosure and an image sensor 13, in which the image sensor 13 is disposed on an image surface (not shown) of the imaging lens module 12. Therefore, a better image quality can be achieved, and hence the high-end imaging requirements of modern electronic devices can be satisfied.

Furthermore, the user activates the capturing mode via a user interface 19 of the electronic device 10, in which the user interface 19 of the 11th example can be a touch screen 19a, a button 19b and etc. At this moment, the imaging light is converged on the image sensor 13 of the imaging lens module 12, and the electronic signal associated with image is output to an image signal processor (ISP) 18.

Figure 11C:
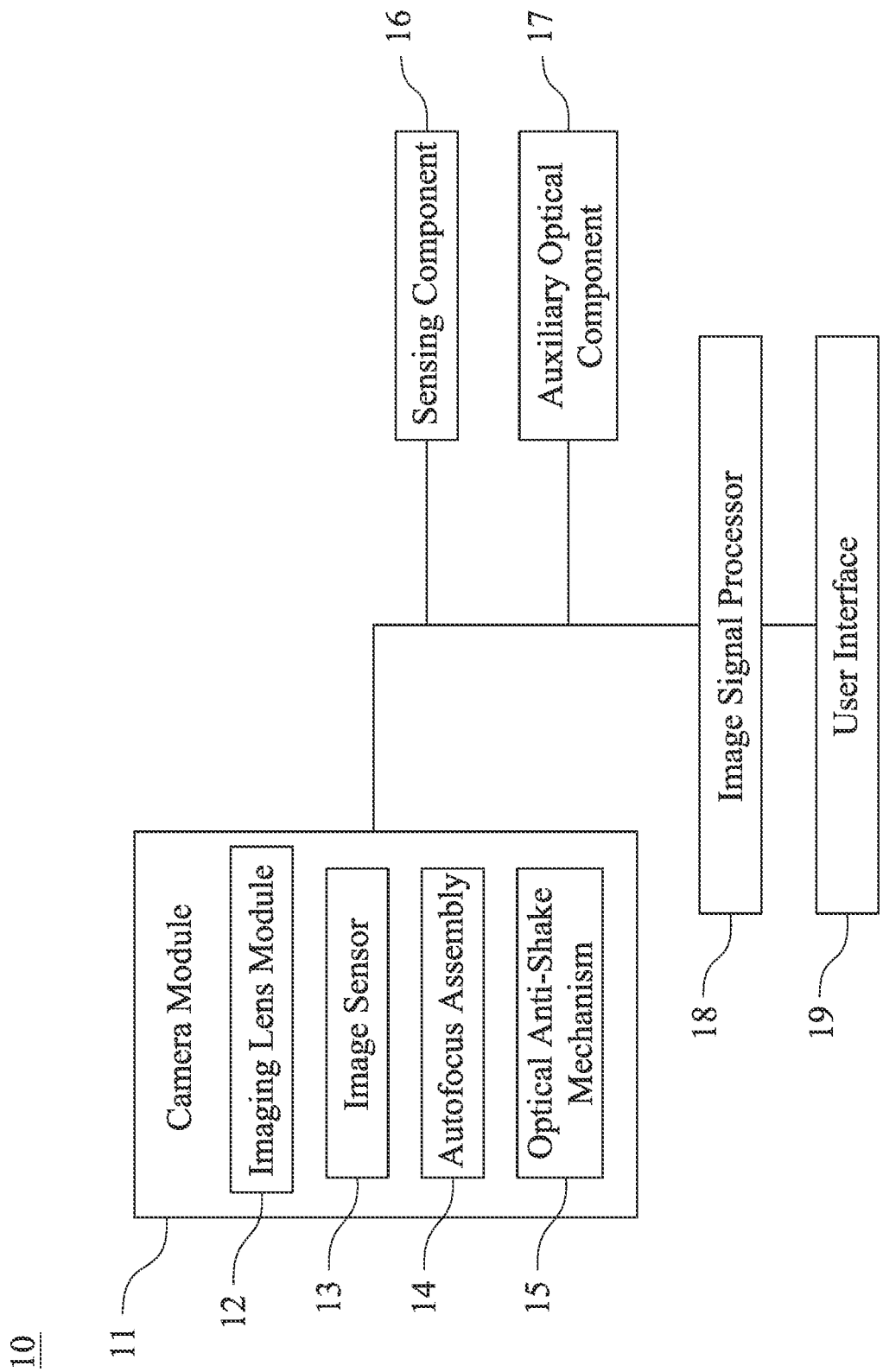
FIG. 11C is a block diagram of the electronic device of the 11th example.

FIG. 11C is a block diagram of the electronic device 10 of the 11th example, and in particular, the block diagram is related to the camera of the electronic device 10. In FIG. 11A to FIG. 11C, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 11B, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 11th example, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory (ROM), or a combination thereof.

12TH EXAMPLE

Figure 12:
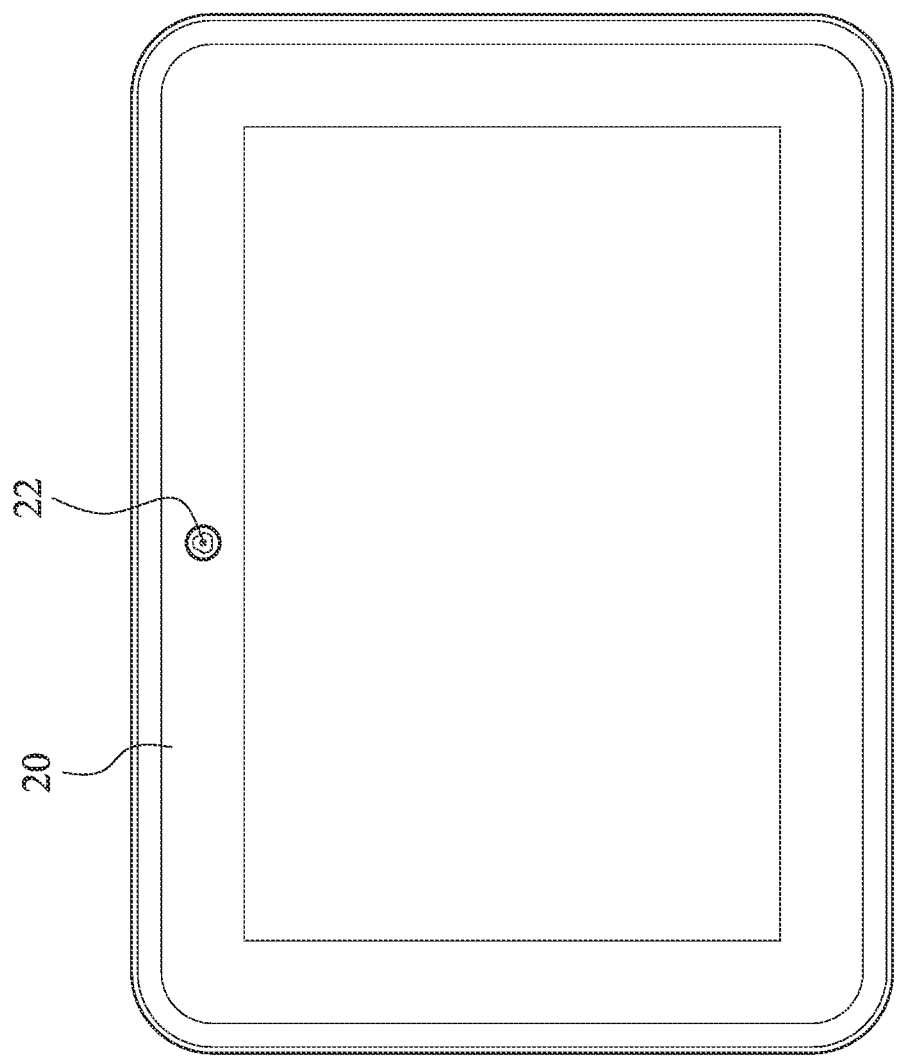
FIG. 12 is a schematic view of an electronic device according to the 12th example of the present disclosure.

FIG. 12 is a schematic view of an electronic device 20 according to the 12th example of the present disclosure. In FIG. 12, the electronic device 20 of the 12th embodiment is a tablet personal computer. The electronic device 20 includes an imaging lens module 22 according to any of the examples of the present disclosure and an image sensor (not shown in the figure). The image sensor is disposed on an image surface (not shown in the figure) of the imaging lens module 22.

13TH EXAMPLE

Figure 13:
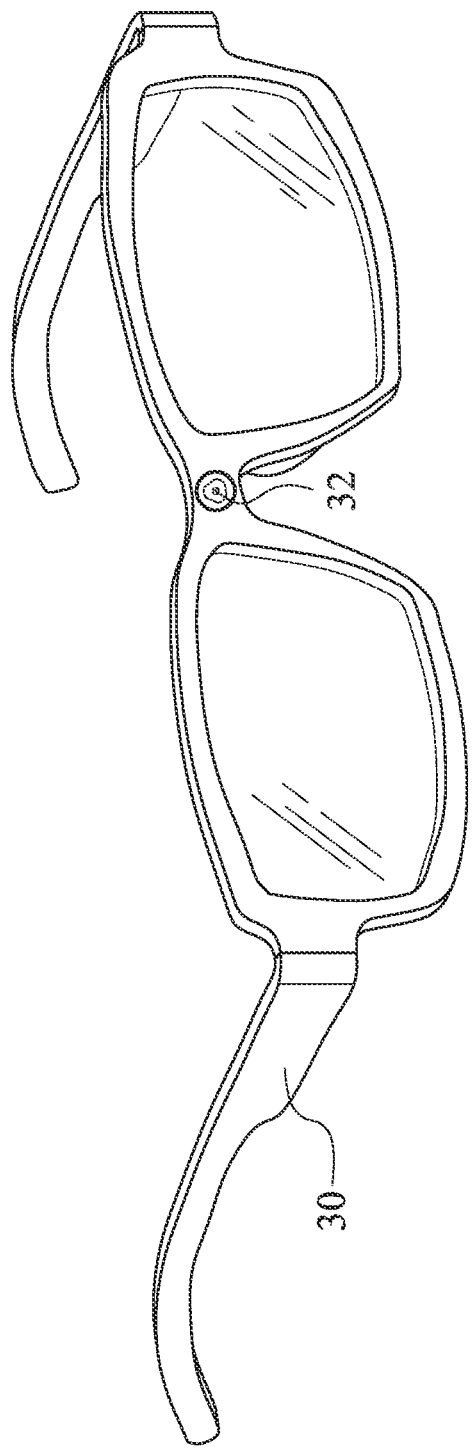
FIG. 13 is a schematic view of an electronic device according to the 13th example of the present disclosure.
Figure 14:
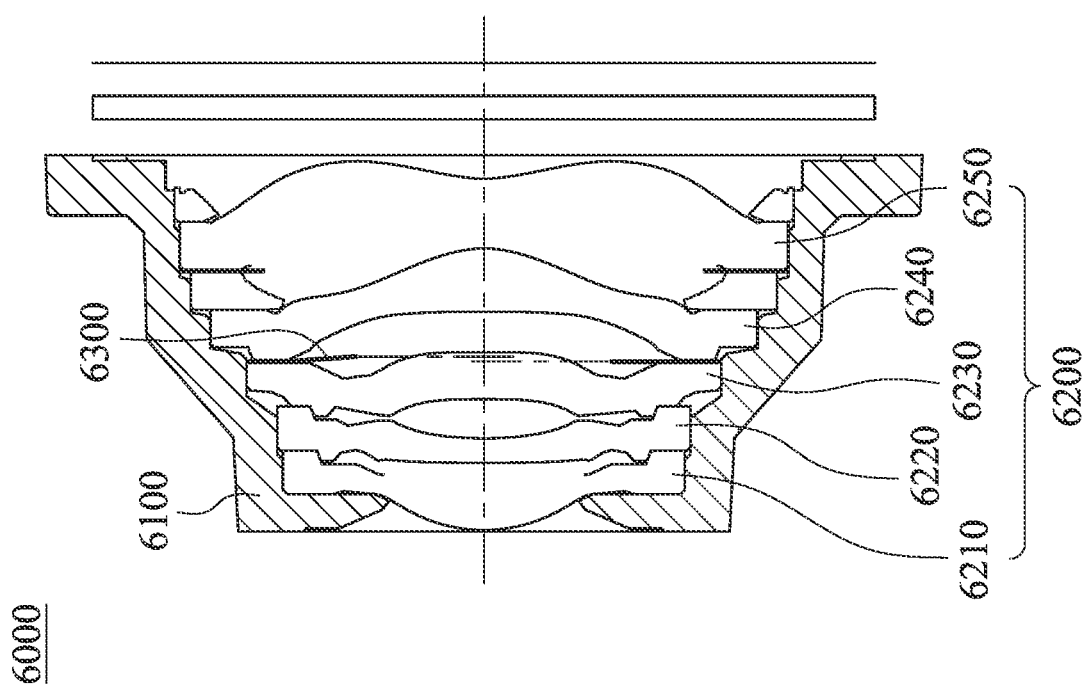
FIG. 14 is a cross-sectional view of a conventional imaging lens module.

FIG. 13 is a schematic view of an electronic device 30 according to the 13th example of the present disclosure. In FIG. 13, the electronic device 30 of the 13th embodiment is a wearable device. The electronic device 30 includes an imaging lens module 32 according to any of the examples of the present disclosure and an image sensor (not shown in the figure). The image sensor is disposed on an image surface (not shown in the figure) of the imaging lens module 32.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An imaging lens set comprising at least three plastic lens elements and at least one light blocking sheet, and each of the plastic lens elements and the light blocking sheet comprising:
    an object-side surface; and
    an image-side surface disposed relative to the object-side surface;
    wherein the at least three plastic lens elements arranged along a central axis of the imaging lens set, which comprises, in order from an object side to an image side:
    a first lens element comprising:
        a first flat abutting portion disposed on the image-side surface of the first lens element; and
        a first conical surface disposed on the image-side surface of the first lens element;
    a second lens element comprising:
        a second flat abutting portion disposed on the object-side surface of the second lens element;
        a second conical surface disposed on the object-side surface of the second lens element; and
        a fourth flat abutting portion disposed on the image-side surface of the second lens element;
        a fourth conical surface disposed on the image-side surface of the second lens element, wherein the fourth conical surface is farer away from the central axis than the fourth flat abutting portion to the central axis;
    a third lens element comprising:
        a third flat abutting portion disposed on the object-side surface of the third lens element; and
        a third conical surface disposed on the object-side surface of the third lens element, wherein the third conical surface is farer away from the central axis than the third flat abutting portion to the central axis;
    wherein the first flat abutting portion is abutted with the second flat abutting portion, the first conical surface contacts with the second conical surface, and the third conical surface contacts with the fourth conical surface;
    wherein the light blocking sheet has a central opening and is coaxially arranged with the plastic lens elements, the light blocking sheet is disposed between the second lens element and the third lens element and further comprises:
        an outer diameter surface connecting the object-side surface and the image-side surface of the light blocking sheet and coaxial with the central opening, wherein the object-side surface of the light blocking sheet is abutted with the fourth flat abutting portion, and the image-side surface of the light blocking sheet is abutted with the third flat abutting portion;
    wherein a width of the fourth conical surface is w4, a minimum diameter of the fourth conical surface is $\psi$4, a maximum diameter of the second conical surface is $\psi 2$, and the following condition is satisfied:

$$2.2 < (\psi 4 - \psi 2)/(2 \times w4) < 6.2.$$

2. The imaging lens set of claim 1, wherein the first conical surface and the second conical surface are assembled with each other for aligning to the central axis, and the fourth conical surface and the third conical surface are assembled with each other for aligning to the central axis.

3. The imaging lens set of claim 2, wherein a diameter of the outer diameter surface of the light blocking sheet is D, the minimum diameter of the fourth conical surface is $\psi 4$, and the following condition is satisfied:

$$|\psi 4 - D|/2 \leq 0.05 \text{ mm}.$$

4. The imaging lens set of claim 2, wherein the minimum diameter of the fourth conical surface is $\psi 4$, the maximum diameter of the second conical surface is $\psi 2$, and the following condition is satisfied:

$$0.18 \text{ mm} < (\psi 4 - \psi 2)/2 < 0.85 \text{ mm}.$$

5. The imaging lens set of claim 2, wherein a diameter of the outer diameter surface of the light blocking sheet is D, the minimum diameter of the fourth conical surface is $\psi 4$, the maximum diameter of the second conical surface is $\psi 2$, and the following condition is satisfied:

$$0.82 < (\pi^2) \times ((\psi 4 - \psi 2)/D) < 2.9.$$

6. The imaging lens set of claim 2, wherein an angle between the second conical surface and the central axis is $\alpha 1$ and corresponding to an angle between the first conical surface and the central axis, an angle between the fourth conical surface and the central axis is $\alpha 2$ and corresponding to an angle between the third conical surface and the central axis, and the following conditions are satisfied:

$$3 \text{ degrees} < \alpha 1 < 42 \text{ degrees; and}$$

$$3 \text{ degrees} < \alpha 2 < 42 \text{ degrees}.$$

7. The imaging lens set of claim 2, wherein a minimum inner diameter of the central opening of the light blocking sheet is $\psi i$, a diameter of the outer diameter surface of the light blocking sheet is D, and the following condition is satisfied:

$$0.4 < \psi i/D < 0.76.$$

8. The imaging lens set of claim 1, wherein an outer diameter of the first lens element is D1, an outer diameter of the second lens element is D2, the minimum diameter of the fourth conical surface is $\psi 4$, and the following condition is satisfied:

$$D1 \leq \psi 4 < D2.$$

9. The imaging lens set of claim 1, wherein the second lens element contacts with the third lens element only via the fourth conical surface and the third conical surface.

10. The imaging lens set of claim 1, wherein an outer diameter of the first lens element is D1, the minimum diameter of the fourth conical surface is $\psi 4$, and the following condition is satisfied:

$$0.9 < \psi 4/D1 < 1.35.$$

11. The imaging lens set of claim 10, wherein the outer diameter of the first lens element is D1, the minimum diameter of the fourth conical surface is $\psi 4$, and the following condition is satisfied:

$$0.94 < \psi 4/D1 < 1.15.$$

12. The imaging lens set of claim 1, wherein an angle between the fourth conical surface and the central axis is $\alpha 2$ and corresponding to an angle between the third conical surface and the central axis, and the following condition is satisfied:

$$13 \text{ degrees} < \alpha 2 < 33 \text{ degrees}.$$

13. The imaging lens set of claim 1, wherein an outer diameter of the second lens element is D2, the width of the fourth conical surface is w4, and the following condition is satisfied:

$$0.1 < (\pi^2) \times w4/D2 < 0.45.$$

14. The imaging lens set of claim 1, wherein the width of the fourth conical surface is w4, the minimum diameter of the fourth conical surface is $\psi 4$, the maximum diameter of the second conical surface is $\psi 2$, and the following condition is satisfied:

$$2.8 < (\psi 4 - \psi 2)/(2 \times w4) < 5.4.$$

15. The imaging lens set of claim 1, wherein a part of the third conical surface is not overlapped with the second lens element along a direction perpendicular to and away from the central axis.

16. An imaging lens module, comprising:
a plastic barrel having a minimum central opening; and
the imaging lens set of claim 1, wherein the imaging lens set is disposed in the plastic barrel.

17. An electronic device, comprising:
the imaging lens module of claim 16; and
an image sensor, wherein the image sensor is disposed on an image surface of the imaging lens module.

* * * * *